(12) United States Patent
Kubota

(10) Patent No.: US 8,297,757 B2
(45) Date of Patent: Oct. 30, 2012

(54) PROJECTOR AND PROJECTOR CONTROL METHOD

(75) Inventor: Shinji Kubota, Ima (JP)

(73) Assignee: Seiko Epson Corporation, Tokyo (JP)

( * ) Notice: Subject to any disclaimer, the term of this patent is extended or adjusted under 35 U.S.C. 154(b) by 464 days.

(21) Appl. No.: 12/605,916

(22) Filed: Oct. 26, 2009

(65) Prior Publication Data

US 2010/0103386 A1  Apr. 29, 2010

(30) Foreign Application Priority Data

Oct. 29, 2008  (JP) ................................. 2008-278551
Oct. 29, 2008  (JP) ................................. 2008-278558
Aug. 7, 2009  (JP) ................................. 2009-185002

(51) Int. Cl.
G03B 21/14  (2006.01)
G03B 3/00  (2006.01)

(52) U.S. Cl. ......................................... 353/70; 353/121

(58) Field of Classification Search .................... 353/69, 353/70, 121

See application file for complete search history.

(56) References Cited

U.S. PATENT DOCUMENTS

| 6,686,973 | B2* | 2/2004 | Su .................................. 348/745 |
| 6,843,569 | B2* | 1/2005 | Hirao et al. ...................... 353/70 |
| 6,877,863 | B2* | 4/2005 | Wood et al. ..................... 353/70 |
| 6,877,864 | B1* | 4/2005 | Tamura et al. .................. 353/70 |
| 6,974,217 | B2* | 12/2005 | Kimura et al. ................. 353/69 |
| 7,070,283 | B2 | 7/2006 | Akutsu |
| 7,144,115 | B2* | 12/2006 | Li .................................. 353/31 |
| 7,150,536 | B2* | 12/2006 | Inoue .............................. 353/69 |
| 7,175,285 | B2* | 2/2007 | Li et al. ........................... 353/70 |
| 7,201,482 | B2* | 4/2007 | Tamura ........................... 353/70 |
| 7,303,285 | B2* | 12/2007 | Inoue .............................. 353/70 |
| 7,344,253 | B2* | 3/2008 | Tamura ........................... 353/69 |
| 7,484,854 | B2* | 2/2009 | Miyasaka ..................... 353/101 |
| 7,690,797 | B2* | 4/2010 | Higashi .......................... 353/69 |
| 7,905,607 | B2* | 3/2011 | Takatsu et al. ................. 353/70 |
| 8,009,929 | B2* | 8/2011 | Sakurai ......................... 382/286 |
| 2002/0122161 | A1* | 9/2002 | Nishida et al. ................. 353/70 |
| 2003/0223048 | A1* | 12/2003 | Kimura ........................... 353/70 |
| 2004/0036844 | A1* | 2/2004 | Wood et al. ..................... 353/70 |
| 2004/0041985 | A1* | 3/2004 | Kimura et al. ................. 353/70 |
| 2005/0162624 | A1 | 7/2005 | Miyasaka |
| 2005/0231820 | A1* | 10/2005 | Miyasaka ..................... 359/686 |
| 2006/0103811 | A1* | 5/2006 | May et al. ........................ 353/69 |
| 2006/0197921 | A1* | 9/2006 | Kurosu et al. .................. 353/70 |

(Continued)

FOREIGN PATENT DOCUMENTS

JP  A 2002-268142  9/2002

(Continued)

*Primary Examiner* — John Lee
(74) *Attorney, Agent, or Firm* — Oliff & Berridge, PLC

(57) ABSTRACT

A projector which projects an image onto a projection surface, and displays it thereon, includes: a light source; a light modulator which modulates light from the light source into an image light representing the image; a projection optical system which projects the image light modulated by the light modulator onto the projection surface; a keystone distortion correction section which carries out a keystone distortion correction process for correcting a keystone distortion of the image projected onto the projection surface; a detection section which detects a stop of a movement of the projector; and a control section which, on the stop of the movement of the projector being detected in the detection section, causes the keystone distortion correction section to start the keystone distortion correction process in accordance with a relative positional relationship between the projector after being moved and the projection surface.

14 Claims, 12 Drawing Sheets

U.S. PATENT DOCUMENTS

| | | |
|---|---|---|
| 2006/0204125 A1* | 9/2006 | Kempf et al. ................ 382/274 |
| 2006/0256298 A1* | 11/2006 | Knipe ............................ 353/69 |
| 2006/0285080 A1* | 12/2006 | Kurihara ........................ 353/70 |
| 2006/0285089 A1* | 12/2006 | Higashi ......................... 353/101 |
| 2007/0097328 A1* | 5/2007 | Li et al. ......................... 353/70 |
| 2007/0249396 A1 | 10/2007 | Nitta et al. |
| 2008/0079907 A1* | 4/2008 | Takatsu et al. ................. 353/70 |
| 2010/0046088 A1* | 2/2010 | Kubota ........................ 359/697 |
| 2010/0103385 A1* | 4/2010 | Kubota .......................... 353/70 |
| 2010/0103386 A1* | 4/2010 | Kubota .......................... 353/70 |
| 2010/0165302 A1* | 7/2010 | Ozawa ........................... 353/70 |
| 2010/0177283 A1* | 7/2010 | Tanaka .......................... 353/69 |
| 2010/0265469 A1* | 10/2010 | Matsumoto et al. ........... 353/70 |
| 2010/0302466 A1* | 12/2010 | Kubota ........................ 348/745 |
| 2011/0288964 A1* | 11/2011 | Linder et al. ................ 705/27.1 |

FOREIGN PATENT DOCUMENTS

| | | |
|---|---|---|
| JP | A-2003-032579 | 1/2003 |
| JP | A-2003-131118 | 5/2003 |
| JP | A-2003-204495 | 7/2003 |
| JP | A 2003-348498 | 12/2003 |
| JP | A 2005-72953 | 3/2005 |
| JP | A-2005-148381 | 6/2005 |
| JP | A 2005-257766 | 9/2005 |
| JP | A 2006-54824 | 2/2006 |
| JP | A 2006-304100 | 11/2006 |
| JP | A-2007-228154 | 9/2007 |

* cited by examiner

Liquid crystal panel
FIG. 10A1
Keystone correction 1
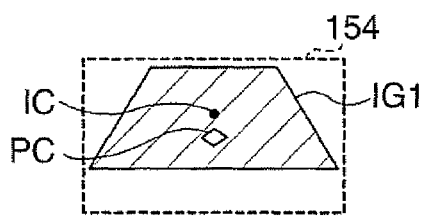
↓ Cancel keystone correction
Display guide pattern
FIG. 10A2
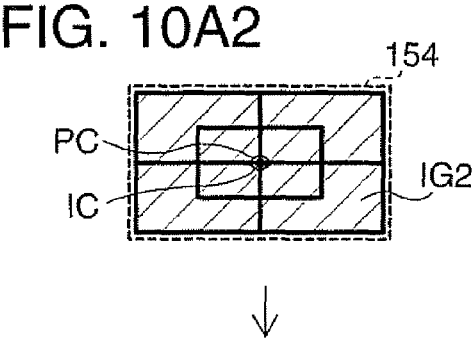
↓
FIG. 10A3
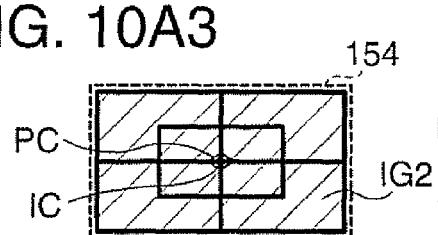
↓ Keystone correction 2
FIG. 10A4
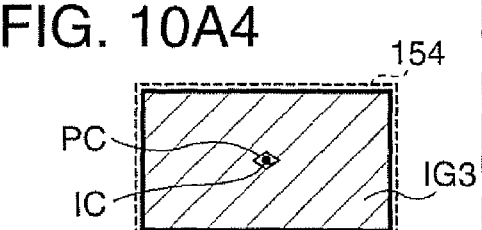
Display image
FIG. 10B1
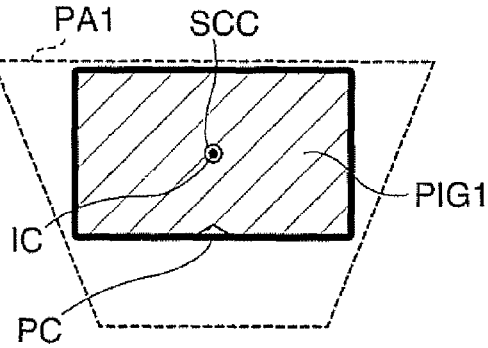
↓ Start movement of projector
FIG. 10B2
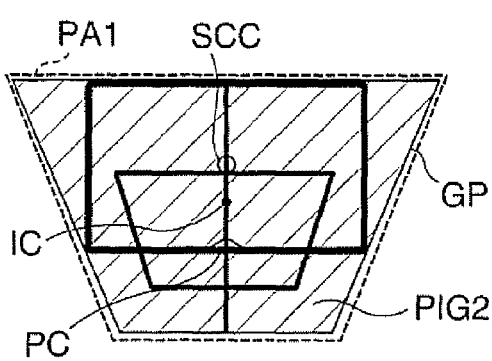
↓ Change screen position / change projector position
FIG. 10B3
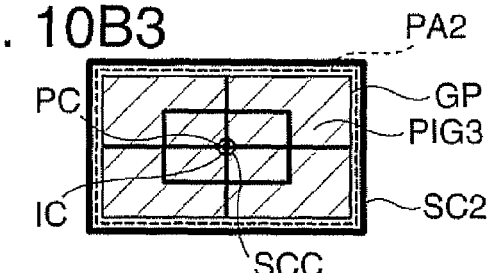
FIG. 10B4
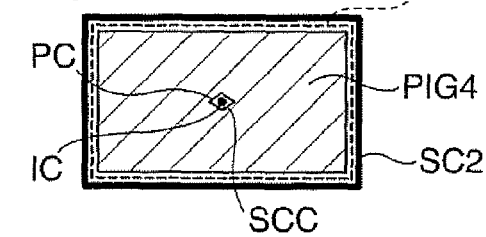

Liquid crystal panel | Display image
FIG. 12A1
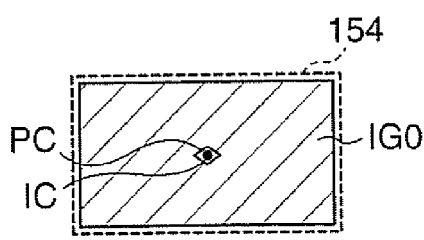
↓ Keystone correction 1
FIG. 12A2
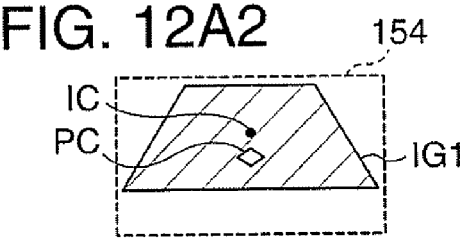
↓ As it is
FIG. 12A3
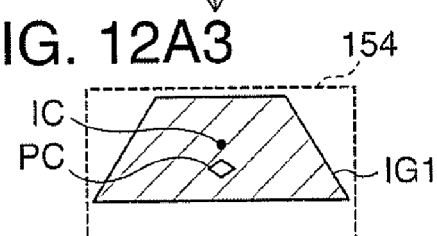
↓ Keystone correction 2
FIG. 12A4
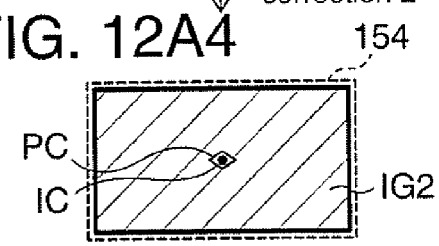
FIG. 12B1
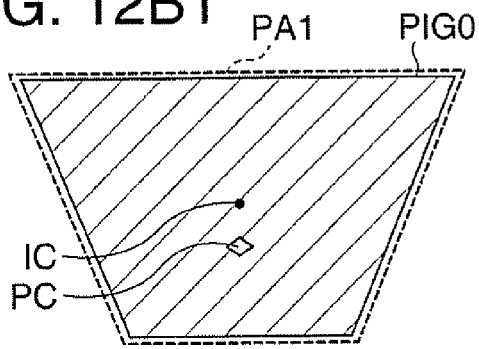
FIG. 12B2
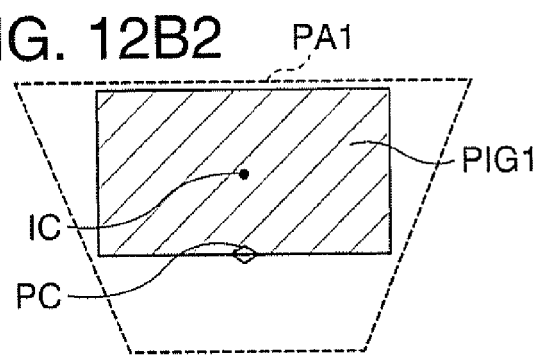
↓ Change screen position / change projector position
FIG. 12B3
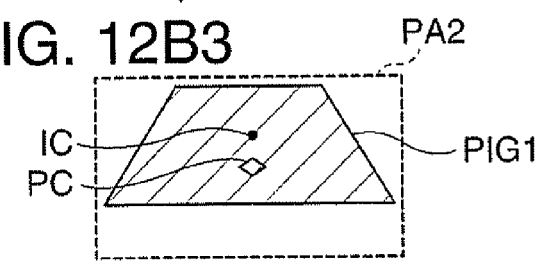
FIG. 12B4
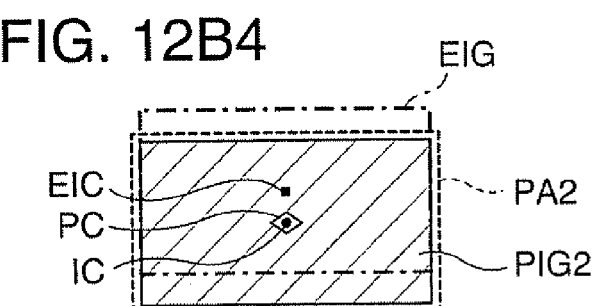

PROJECTOR AND PROJECTOR CONTROL METHOD

The entire disclosure of Japanese Patent No. 2008-278551 filed Oct. 29, 2008, Japanese Patent No. 2008-278558 filed Oct. 29, 2008 and Japanese Patent No. 2009-185002 filed Aug. 8, 2009 are expressly incorporated by reference herein.

BACKGROUND

1. Technical Field

The present invention relates to a projector which displays an image on a projection surface.

2. Related Art

When a projector is used to cause an image whose image bounds form a rectangle to be displayed on a projection surface of a screen or the like, depending on a relative positional relationship between the projector and the projection surface, it may happen that the image bounds of the image displayed on the projection surface (hereafter referred to also as the "projection image") are distorted into a trapezoid. In this kind of case, a keystone correction is used which corrects a distortion of the projection image (hereafter referred to also as a "keystone distortion").

Heretofore, in the projector, as a function of performing the keystone correction, there have been a function of manually performing the keystone correction (hereafter referred to also as a "keystone manual correction"), and a function of automatically performing the keystone correction (hereafter referred to also as a "keystone automatic correction"). When the keystone manual correction function is used, a user, by operating an operation button or the like included in the projector while observing the image bounds of the image projected onto the screen, and gradually changing the shape of image bounds generated on a liquid crystal panel, implements the keystone correction in such a way that the shape of the image bounds of the image projected becomes rectangular (refer to, for example, JP-A-2006-54824).

On the other hand, when the keystone automatic correction function is used, the projector, by imaging an image projected onto the screen by means of, for example, a camera included in the projector and, based on the image imaged, calculating a tilt of the projection axis of the projector with respect to the screen, automatically implements the keystone correction in such a way that the shape of the image bounds of the projection image becomes rectangular. The keystone automatic correction is started by, for example, the user operating the operation button included in the projector.

Even in the case in which the projector includes the keystone automatic correction function, there has been a case in which the user is not aware of that function because the keystone automatic correction is not started unless the user operates the operation button, as heretofore described. In the event that the user is not aware of the keystone automatic correction function, as the user implements the keystone manual correction while observing the image bounds of the image projected onto the screen in the way heretofore described, it takes a lot of trouble, and it takes time until an image whose image bounds form a rectangle is displayed on the screen, causing inconvenience.

This kind of problem has been a problem common not only to a case of implementing a keystone correction in the projector, but also to a case of adjusting a projected image in accordance with a relative positional relationship between the projector and the projection surface in a case of adjusting a focus, in a case of carrying out an enlargement and reduction (zoom) adjustment, or the like.

SUMMARY

An advantage of some aspects of the invention is to provide a technology which improves user-friendliness.

The invention can be realized as the following aspects or application examples.

Application Example 1

A projector of this application example, which projects an image onto a projection surface, and displays it thereon, includes a light source; a light modulator which modulates light from the light source into an image light representing the image; a projection optical system which projects the image light modulated by the light modulator onto the projection surface; a keystone distortion correction section which carries out a keystone distortion correction process for correcting a keystone distortion of the image projected onto the projection surface; a detection section which detects a stop of a movement of the projector; and a control section which, on the stop of the movement of the projector being detected in the detection section, causes the keystone distortion correction section to start the keystone distortion correction process in accordance with a relative positional relationship between the projector after being moved and the projection surface.

In this specification, the movement of the projector includes not only moving the position of the projector to another, but changing a projection angle of the projector with respect to the projection surface.

According to this projector, on the stop of the movement of the projector being detected, the keystone distortion correction process at a destination of the projector is started. For example, in the event that a user has moved the projector, at the destination, the keystone distortion correction process is automatically carried out even though the user does not carry out an operation for performing a keystone distortion correction, so user-friendliness is improved.

Application Example 2

In the projector of this application example, the detection section, including an angular velocity sensor which detects an angular velocity of the projector, detects the stop of the movement of the projector in the event that a predetermined time has elapsed in a condition in which the angular velocity detected by the angular velocity sensor, after exceeding a first value set in advance, becomes lower than a second value which is lower than the first value, and maintains a value lower than the second value.

According to this projector, it is possible, using the angular velocity sensor, to easily detect the movement and stop of the projector.

Application Example 3

The projector of this application example further includes an autofocus section which automatically adjusts a focus in the projection optical system in such a way that an image is formed on the projection surface. The control section, on the stop of the movement of the projector being detected, causes the autofocus section to start the adjustment of the focus.

According to this projector, on the stop of the movement of the projector being detected, the adjustment of the focus is started. For example, in the event that the user has moved the projector, at a destination, a focus adjustment process is automatically carried out even though the user does not carry out an operation for carrying out the adjustment of the focus, so the user-friendliness is improved.

Application Example 4

A projector of this application example, the detection section detects the start of the movement of the projector, and the control section, when the start of the movement of the projector is detected in the detection section, cancels the keystone distortion correction process in the keystone distortion correction section.

According to this projector, on the start of the movement of the projector being detected, the keystone distortion correction process is cancelled. On the keystone distortion correction process being cancelled, an image display area which is the whole area of the image displayed on the projection surface coincides with the whole display area of a liquid crystal panel. When the position of the projector is set in such a way that the center of the image display area in the condition in which the keystone distortion correction process is cancelled is aligned with the center of an area in which the user wants to display the image, it means that the projection axis of the projector is aligned with the center of the area in which the user wants to display the image. For this reason, in the event that the keystone distortion correction process is carried out after the movement of the projector, it is possible to reduce a misalignment between an image display position after the keystone distortion correction process and an image display position assumed by the user.

According to this projector, on the start of the movement of the projector being detected, the adjustment of the keystone distortion correction process is canceled. However, after the movement of the projector is stopped, the keystone distortion correction process is automatically carried out, so the user-friendliness is improved.

Application Example 5

The projector of this application example further includes a storage section in which are stored guide pattern data representing a guide pattern which shows the center of a maximum area of the light modulator in which the light from the light source can be modulated. The control section, as well as canceling the keystone distortion correction process in the keystone distortion correction section, causes the light modulator to generate an image light representing the guide pattern based on the guide pattern data stored in the storage section.

According to this projector, as the center of the maximum area of the light modulator in which the light can be modulated can be ascertained from the guide pattern, it is possible for the user to set the position of the projector depending on the guide pattern. As a result, the user-friendliness is improved.

Application Example 6

A projector of this application example, which projects an image onto a projection surface, and displays it thereon, includes a light source; a light modulator which modulates light from the light source into an image light representing the image; a projection optical system which includes an autofocus section for automatically adjusting a focus in such a way that the image light modulated by the light modulator is imaged on the projection surface; a detection section which detects a stop of a movement of the projector; and a control section which, on the stop of the movement of the projector being detected in the detection section, causes the autofocus section to start the adjustment of the focus. includes According to this projector, on the stop of the movement of the projector being detected, the adjustment of the focus is started at a destination of the projector without the operation of adjustment of the focus by the user. As a result, the user-friendliness is improved.

Application Example 7

In the projector of this application example, further includes a keystone distortion correction section which carries out a keystone distortion correction process for correcting a keystone distortion of the image projected onto the projection surface. The control section, on the stop of the movement of the projector being detected in the detection section, causes the keystone distortion correction section to start the keystone distortion correction process in accordance with a relative positional relationship between the projector after being moved and the projection surface.

According to this projector, on the stop of the movement of the projector being detected, the keystone distortion correction process at a destination of the projector is started. For example, in the event that the user has moved the projector, at the destination, the keystone distortion correction process is automatically carried out even though the user does not carry out an operation for performing a keystone distortion correction, so the user-friendliness is improved.

Application Example 8

In the projector of this application example, the detection section detects the start of the movement of the projector, and the control section, when the start of the movement of the projector is detected in the detection section, cancels the keystone distortion correction process in the keystone distortion correction section.

According to this projector, on the start of the movement of the projector being detected, the keystone distortion correction process is cancelled. On the keystone distortion correction process being cancelled, an image display area which is the whole area of the image displayed on the projection surface coincides with the whole display area of a liquid crystal panel. When the position of the projector is set in such a way that the center of the image display area in the condition in which the keystone distortion correction process is cancelled is aligned with the center of an area in which the user wants to display the image, it means that the projection axis of the projector is aligned with the center of the area in which the user wants to display the image. For this reason, in the event that the keystone distortion correction process is carried out after the movement of the projector, it is possible to reduce a misalignment between an image display position after the keystone distortion correction process and an image display position assumed by the user.

Application Example 9

In the projector of this application example, further including a storage section in which are stored guide pattern data representing a guide pattern which shows the center of a maximum area of the light modulator in which the light from the light source can be modulated. The control section, as well as canceling the keystone distortion correction process in the keystone distortion correction section, causes the light modulator to generate an image light representing the guide pattern based on the guide pattern data stored in the storage section.

According to this projector, as the center of the maximum area of the light modulator in which the light can be modulated can be ascertained from the guide pattern, it is possible for the user to set the position of the projector depending on the guide pattern. As a result, the user-friendliness is improved.

Application Example 10

A projector of this application example, which projects an image onto a projection surface, and displays it thereon, includes a light source; a light modulator which modulates light from the light source into an image light representing the image; a projection optical system which includes an autofocus section for automatically adjusting a focus in such a way that the image light modulated by the light modulator is imaged on the projection surface; a keystone distortion correction section which carries out a keystone distortion correction process for correcting a keystone distortion of the image projected onto the projection surface; detection section which detects a stop of a movement of the projector; and a control section which, on the stop of the movement of the projector being detected in the detection section, as well as causing the keystone distortion correction section to start the keystone distortion correction process in accordance with a relative positional relationship between the projector after being moved and the projection surface, causes the autofocus section to start the adjustment of the focus.

According to this projector, on the stop of the movement of the projector being detected, the keystone distortion correction process and the adjustment of the focus are started at a destination of the projector without the operation of adjustment of the focus by the user. As a result, the user-friendliness is improved.

Application Example 11

In the projector of this application example, the detection section detects the start of the movement of the projector, and the control section, when the start of the movement of the projector is detected in the detection section, cancels the keystone distortion correction process in the keystone distortion correction section.

According to this projector, on the start of the movement of the projector being detected, the keystone distortion correction process is cancelled. On the keystone distortion correction process being cancelled, an image display area which is the whole area of the image displayed on the projection surface coincides with the whole display area of a liquid crystal panel. When the position of the projector is set in such a way that the center of the image display area in the condition in which the keystone distortion correction process is cancelled is aligned with the center of an area in which the user wants to display the image, it means that the projection axis of the projector is aligned with the center of the area in which the user wants to display the image. For this reason, in the event that the keystone distortion correction process is carried out after the movement of the projector, it is possible to reduce a misalignment between an image display position after the keystone distortion correction process and an image display position assumed by the user.

Application Example 12

In the projector of this application example, further includes a storage section in which are stored guide pattern data representing a guide pattern which shows the center of a maximum area of the light modulator in which the light from the light source can be modulated. The control section, as well as canceling the keystone distortion correction process in the keystone distortion correction section, causes the light modulator to generate an image light representing the guide pattern based on the guide pattern data stored in the storage section.

According to this projector, as the center of the maximum area of the light modulator in which the light can be modulated can be ascertained from the guide pattern, it is possible for the user to set the position of the projector depending on the guide pattern. As a result, the user-friendliness is improved.

The invention, not being limited to the heretofore described aspects of the projector, can also be realized in various forms such as a form as a method of controlling a projector, a form as a computer program for controlling the projector, and a form as a storage medium in which the computer program is stored.

BRIEF DESCRIPTION OF THE DRAWINGS

The invention will be described with reference to the accompanying drawings, wherein like numbers reference like elements.

FIGS. 10A1, A2, A3, A4, B1, B2, B3 and B4 are illustrations conceptually showing a display image when the position of the projector 100 has been moved, respectively showing the image on the liquid crystal panel 154 (A1 to A4) and on an image display area (B1 to B4).

FIGS. 12A1, A2, A3, A4, B1, B2, B3 and B4 are illustrations conceptually showing a display image when the position of the projector has been moved, A1 to A4 of FIG. 12 showing a liquid crystal panel 154 included in the projector 100p and B1 to B4 of FIG. 12 showing an image display area PIG, which is an area on the wall surface in which the image is displayed.

DESCRIPTION OF EXEMPLARY EMBODIMENTS

Hereafter, a best mode for implementing the invention will be described, based on embodiments, in the following order.

A. First Embodiment
B. Second Embodiment
C. Modification Examples

A. First Embodiment

A-1. Configuration of Embodiment

Figure 1:
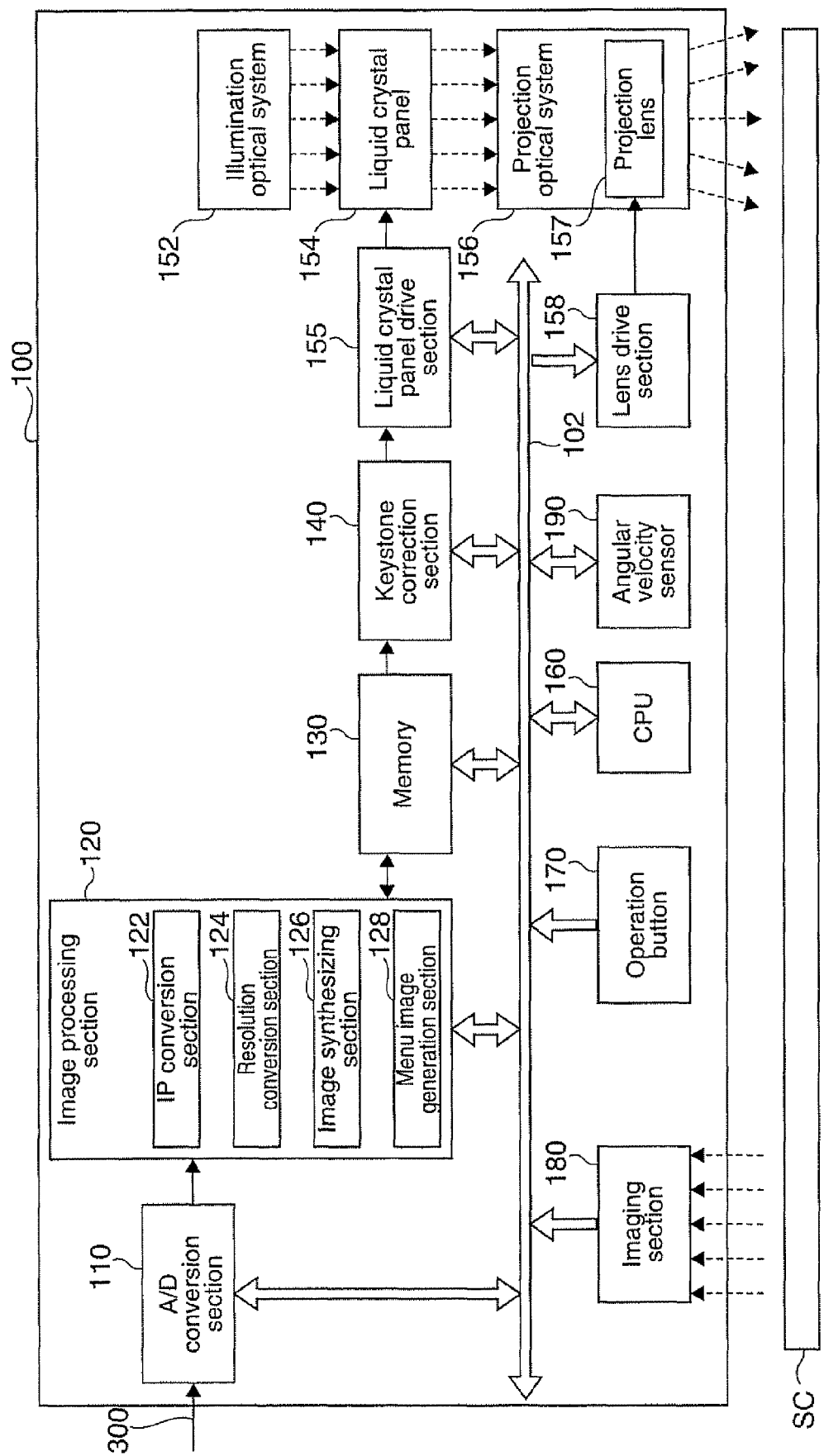
FIG. 1 is a block diagram schematically showing a configuration of a projector as one embodiment of the first embodiment.

FIG. 1 is a block diagram schematically showing a configuration of a projector as one embodiment of the invention. As shown in the diagram, the projector 100 includes an A/D conversion section 110, an image processing section 120, a memory 130, a keystone correction section 140, a liquid crystal panel 154, a liquid crystal panel drive section 155, an illumination optical system 152, a projection optical system 156 including a projection lens 157, a lens drive section 158, a CPU 160, an operation button 170, an imaging section 180, and an angular velocity sensor 190. The memory 130 may include areas for storing digital image signal (original image data) supplied from the A/D conversion section 110 and uncorrected image data which is stated later.

The A/D conversion section 110 carries out an A/D conversion, as necessary, on an input image signal input via a cable 300 from an unshown DVD player, personal computer, or the like, and outputs a digital image signal.

The image processing section 120 writes the digital image signal output from the A/D conversion section 110 into the memory 130 for each frame. The image processing section 120 includes functions as an IP conversion section 122, a resolution conversion section 124, an image synthesizing section 126, and a menu image generation section 128.

The IP conversion section 122 executes a process of converting a format of image data stored in the memory 130 from an interlace type to a progressive type, and supplies the obtained image data to the resolution conversion section 124.

The resolution conversion section 124 subjects the image data supplied from the IP conversion section 122 to a size enlargement process or reduction process (that is, a resolution conversion process), and supplies the obtained image data to the image synthesizing section 126.

The menu image generation section 128, when the user operates the operation button 170 to instruct to show the menu image, generates a character or symbol representing an operating condition of the projector 100, or an image for when carrying out an image quality adjustment or the like, and supplies it to the image synthesizing section 126.

The image synthesizing section 126 synthesizes a menu image generated by the menu image generation section 128, and the image data supplied from the resolution conversion section 124, and writes them into the memory 130 as uncorrected image data. On a case in which the menu image is not generated, the image data supplied from the resolution conversion section 124 is stored into the memory 130 as the uncorrected image data.

The keystone correction section 140 corrects a keystone distortion occurring when projecting in a condition in which the projection axis of the projector 100 is tilted with respect to a screen SC. Specifically, the uncorrected image data stored in the memory 130 is read out by accessing the address storing the uncorrected image data in the memory 130. Then the uncorrected image data read out are subjected to a correction process in such a way as to compensate for the keystone distortion, and supplied to the liquid crystal panel drive section 155 as corrected image data. And a keystone correction amount (stated later) in accordance with the position of the projector to the screen SC is calculated. A detailed description will hereafter be given of the process in the keystone correction section 140. The keystone correction section 140 in this embodiment corresponds to a keystone distortion correction section in the claims.

The liquid crystal panel drive section 155 drives the liquid crystal panel 154 based on the corrected image data input by way of the keystone correction section 140. The liquid crystal panel 154 is configured of a transmissive liquid crystal panel in which a plurality of pixels are disposed in a matrix form. The liquid crystal panel 154 is driven by the liquid crystal panel drive section 155 and, by changing an optical transmittance in each of the pixels disposed in the matrix form, modulates an illumination light emitted from the illumination optical system 152 into an effective image light representing an image. The liquid crystal panel drive section 155 and liquid crystal panel 154 in this embodiment correspond to a light modulator in the claims.

The [EPU1] illumination optical system 152 is configured including a lamp or the like such as, for example, a high pressure mercury-vapor lamp or an ultrahigh pressure mercury-vapor lamp, or another light emitting body. The illumination optical system 152 in this embodiment corresponds to a light source in the claims.

The projection optical system 156, being attached to a front of the casing of the projector 100, enlarges and projects light modulated into the image light by the liquid crystal panel 154. The projection lens 157 includes a plurality of lenses, including a zoom lens and a focus lens. The zoom lens and focus lens move back and forth along the optical axis of the projection optical system 156.

With the lens drive section 158, by driving the projection lens 157 included in the projection optical system 156, it is possible to adjust a focus, and change a zoom condition. By changing the zoom condition, a degree of enlargement (a magnification) when projecting light transmitted through the liquid crystal panel 154 changes in the projection optical system 156. That is, with the lens drive section 158, by driving the projection lens 157, it is possible to change the size of an image displayed on the screen SC. The projection optical system 156 in this embodiment corresponds to a projection optical system in the claims.

The operation button 170 is operated by a user, and an instruction from the user is transmitted to the CPU 160 via a bus 102. In this embodiment, the projector 100 is configured so as to receive an instruction from the user through the operation button 170, but it is also possible to configure so that it receives an instruction from the user through another component such as, for example, a remote control.

The imaging section 180, including a CCD camera, generates an imaged image. The imaged image generated by the imaging section 180 is stored in an unshown imaged image memory. It is also possible to configure so that the imaging section 180 includes another imaging device in place of the CCD camera.

Figure 2:
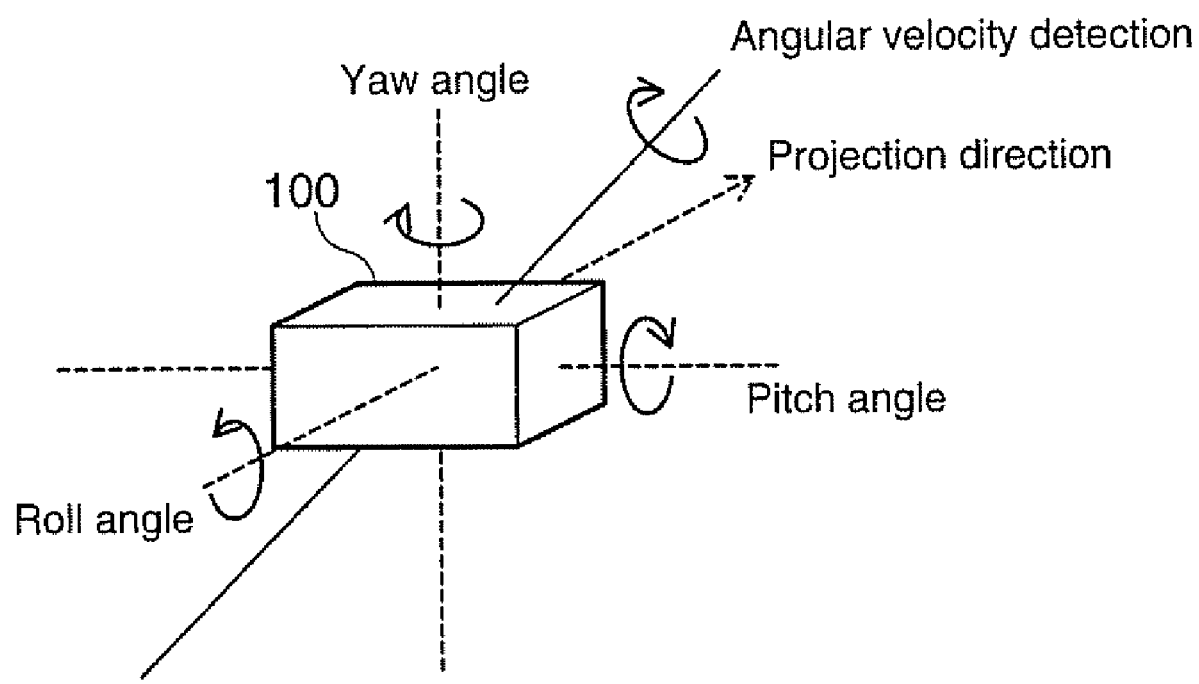
FIG. 2 is a diagram showing an angular velocity detection axis of the projector 100.

The angular velocity sensor 190 detects an angular velocity around an angular velocity detection axis passing through the center of the projector 100. FIG. 2 is a diagram showing the angular velocity detection axis of the projector 100. As shown in FIG. 2, a rotation angle around a projection axis is referred to as a roll angle, a projection angle in a vertical direction as a pitch angle, and a projection angle in a horizontal direction as a yaw angle. The angular velocity detection axis, passing through an intersection of the projection axis, a vertical axis and a horizontal axis (that is, the center of the projector 100), is disposed in such a way as to divide the projection axis, vertical axis and horizontal axis equally. By an angular velocity around the angular velocity detection axis being detected by the angular velocity sensor 190, it is possible to detect a movement of the projector 100 around the projection axis, in the vertical direction, or in the horizontal direction, and a stop of the movement.

The CPU 160, by retrieving and executing a control program stored in the memory 130, controls an operation of each section in the projector 100. Also, the CPU 160, based on the angular velocity detected by the angular velocity sensor 190, causes the keystone correction section 140 to start a keystone correction.

A-2. Operation of Projector

Figure 3:
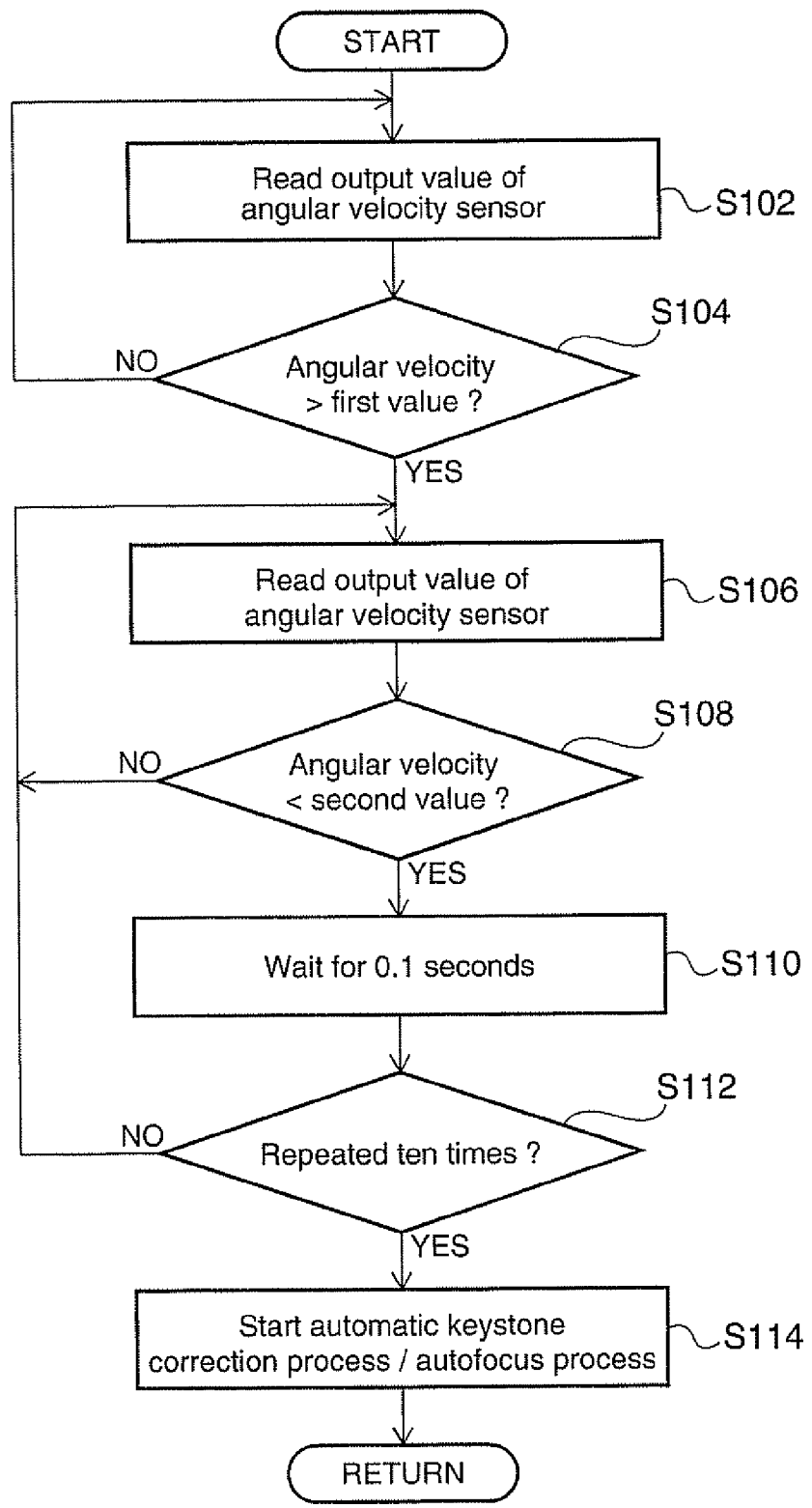
FIG. 3 is a flowchart showing a flow of a keystone correction and autofocus starting process in the projector 100.

FIG. 3 is a flowchart showing a flow of a keystone correction and autofocus starting process in the projector 100 of this embodiment. On the projector 100 being powered on, the CPU 160 reads a detection value of the angular velocity sensor 190 (step S102). The CPU 160 determines whether or not the detected angular velocity is greater than a first value (step S104) and, if the angular velocity is smaller than the first value (No in step S104), returns to step S102. In step S104, the CPU 160, based on the angular velocity detected by the angular velocity sensor 190, determines that the projector 100 has been moved. That is, the case in which the angular velocity is greater than the first value means that the projector 100 has been moved.

If the angular velocity detected by the angular velocity sensor 190 is greater than the first value (Yes in step S104), the CPU 160 reads a detection value of the angular velocity sensor 190 (step S106), and determines whether or not the angular velocity detected by the angular velocity sensor 190 is smaller than a second value (step S108). Herein, the second value is set to be a value smaller than the first value. The first value and second value are set in advance. If the angular velocity is greater than the second value (No in step S108), the CPU 160 returns to step S106.

If the angular velocity is smaller than the second value (Yes in step S108), the CPU 160 waits 0.1 seconds (step S110), and determines whether or not it has repeated the process of step S106 to step S110 ten times (step S112). If it has not repeated the process ten times (No in step S112), the CPU 160 returns to step S106. That is, the CPU 160 repeatedly carries out the process of step S106 to step S110 until it repeats the process of step S106 to step S110 ten times. In this embodiment, the fact that the CPU 160 has repeated the process of step S106 to step S110 ten times means that a predetermined time (one second) has elapsed in a condition in which the angular velocity maintains a value lower than the second value. Of course, even though the sequence of the processes from the step S106 to the step S112 is repeated ten times in this embodiment, the invention is not limited to this example. That is, the predetermined time can be set arbitrarily and is not limited to one second.

In [EPU2] steps S106 to S112, the CPU 160 determines whether or not the movement of the projector 100 has stopped. The fact that the angular velocity is greater than the second value in step S108 is determined to mean that the projector 100 is still being moved (moving). In the event that the angular velocity has been smaller than the second value ten times in a row in step S108, the CPU 160 determines that the movement of the projector 100 has stopped. The first value and second value can be set arbitrarily, for example, in accordance with the result of an experiment.

The CPU 160, on determining that it has repeated the process of steps S106 to S112 ten times (Yes in step S112), causes an automatic keystone correction process and autofocus process to be started (step S114).

Figure 4:
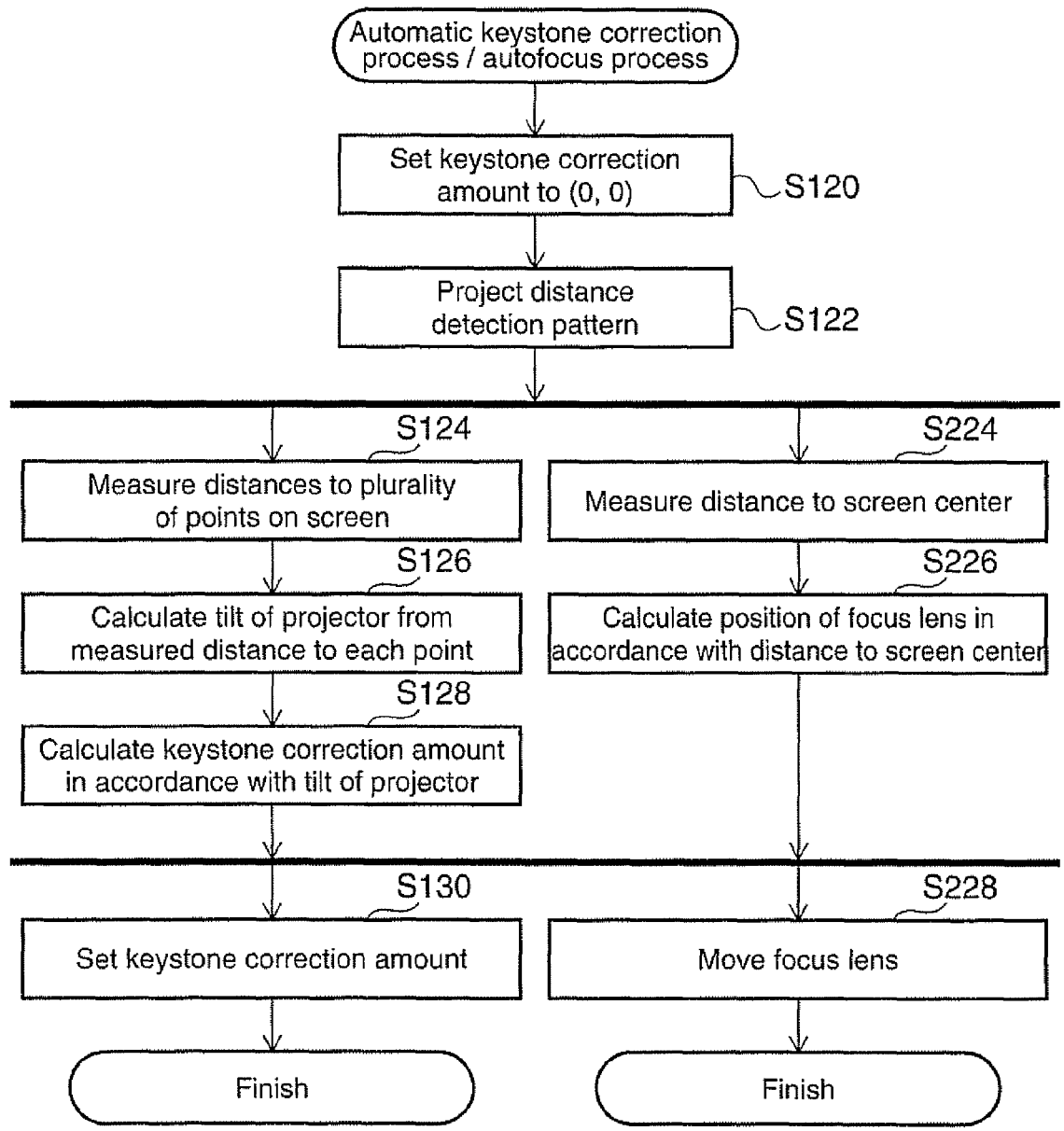
FIG. 4 is a flowchart showing a flow of an automatic keystone correction process, and a flow of an autofocus process, executed in the projector 100.

Next, a simple description will be given, based on FIG. 4, of the automatic keystone correction process and autofocus process which are executed in the projector 100. FIG. 4 is a flowchart showing a flow of the automatic keystone correction process and autofocus process. The "automatic keystone correction process" is a process which sets a keystone correction amount to which an image is subjected in such a way that an image distortion which occurs due to a tilt of the screen SC with respect to the projector 100 decreases. On the other hand, the "autofocus process" is a process which adjusts the focus of a projection light in accordance with a distance from the projector 100 to the screen SC.

As shown in FIG. 4, the keystone correction section 140, on an instruction to start the automatic keystone correction process being given from the CPU 160, initializes the keystone correction amount stored in an internal memory (not shown) of the keystone correction section 140, and sets it to (0, 0) (step S120). The keystone correction amount is defined by the heretofore described pitch angle and yaw angle. Then, the keystone correction section 140, by forwarding a distance detection pattern stored in advance in the memory 130 to the liquid crystal panel drive section 155, projects the distance detection pattern onto the screen SC (step S122). In this embodiment, the distance detection pattern is a pattern including a grid and grid points.

While the distance detection pattern is being projected (step S120), the keystone correction section 140, based on the image imaged by the imaging section 180, measures distances to a plurality of points on the screen SC (step S124). In this embodiment, the distances to the plurality of points on the screen SC are measured by triangulation.

After the distances to the plurality of points on the screen SC have been measured (step S124), the keystone correction section 140, based on the distance to each measured point, calculates a tilt of the projector 100 with respect to the screen SC (step S126). Subsequently, the keystone correction section 140 calculates a keystone correction amount in accordance with the tilt of the projector 100 with respect to the screen SC (step S128).

On the other hand, on an instruction to start the autofocus process being given from the CPU 160, and the distance detection pattern being projected in the way heretofore described, the lens drive section 158, based on the image imaged by the imaging section 180, measures a distance to the center of the screen SC (FIG. 4: step S224). In this embodiment, the distance to the center of the screen SC is measured by triangulation.

Then, after the distance to the center of the screen SC has been measured (step S224), the lens drive section 158 calculates a position of the focus lens in accordance with the distance to the center of the screen SC (step S226). In this embodiment, a table (not shown) in which are set positions of the focus lens (not shown) corresponding to a plurality of distances based on a calibration is stored in the memory 130, and a position of the focus lens is calculated by a linear complementation using values of the table. In this way, in this embodiment, the projector 100, based on the distance detection pattern projected onto the screen SC, obtains a keystone correction amount and a position of the focus lens at a destination of the projector 100.

After a keystone correction amount has been calculated in the keystone correction section 140 (FIG. 4: step S128), and a position of the focus lens has been calculated in the lens drive section 158 (step S226), the keystone correction section 140 sets the calculated keystone correction amount (step S130), and the lens drive section 158 moves the focus lens (not shown) to the calculated position (step S228). By means of this process, at the destination of the projector 100, an image of which the keystone distortion has been corrected, and the focus has been adjusted is displayed on the screen SC.

It is also acceptable to adopt a configuration such that the keystone correction section 140, when generating the corrected image data, corrects a variation in luminance based on the relative positions of the projector 100 and screen SC, and carries out an antialiasing. Also, it is also acceptable to adopt a configuration such that the lens drive section 158, as well as adjusting the focus, also carries out an adjustment of the zoom condition.

In [EPU3] this embodiment, the keystone correction amount is recorded in the internal memory (not shown) of the keystone correction section 140. Consequently, a keystone correction is performed in the keystone correction section 140, based on the keystone correction amount recorded in the internal memory of the keystone correction section 140, until a movement, and a stop of the movement, of the projector 100 are detected again. On a movement, and a stop of the movement, of the projector 100 being detected again, the keystone correction amount recorded in the internal memory of the keystone correction section 140 is cancelled (that is, the keystone correction amount is set to (0, 0)), and a recalculated keystone correction amount is recorded in the internal memory of the keystone correction section 140.

In this embodiment, the previous operating time keystone correction amount is recorded in the internal memory (not shown) of the keystone correction section 140 and, on the projector 100 being powered on, the keystone correction section 140, based on the keystone correction amount recorded in the internal memory of the keystone correction section 140, subjects input uncorrected image data to the keystone correction process, generates corrected image data, and outputs them to the liquid crystal panel drive section 155. In this embodiment, it is acceptable to adopt a configuration such that, when the projector 100 is started, the keystone correction section 140, based on the previous operating time keystone correction amount, implements a keystone correction, and it is also acceptable to adopt a configuration such that it does not implement a keystone correction.

A-3. Advantage of Embodiment

As heretofore described, according to the projector 100 of this embodiment, on a movement of the projector 100 being detected, and the movement of the projector 100 being stopped, the automatic keystone correction process and autofocus process are started. For this reason, a distortion of an image projected onto the screen SC is corrected, and the focus is adjusted, without the user operating anything, so user-friendliness is improved.

B. Second Embodiment

B-1. Configuration of Embodiment

Figure 6:
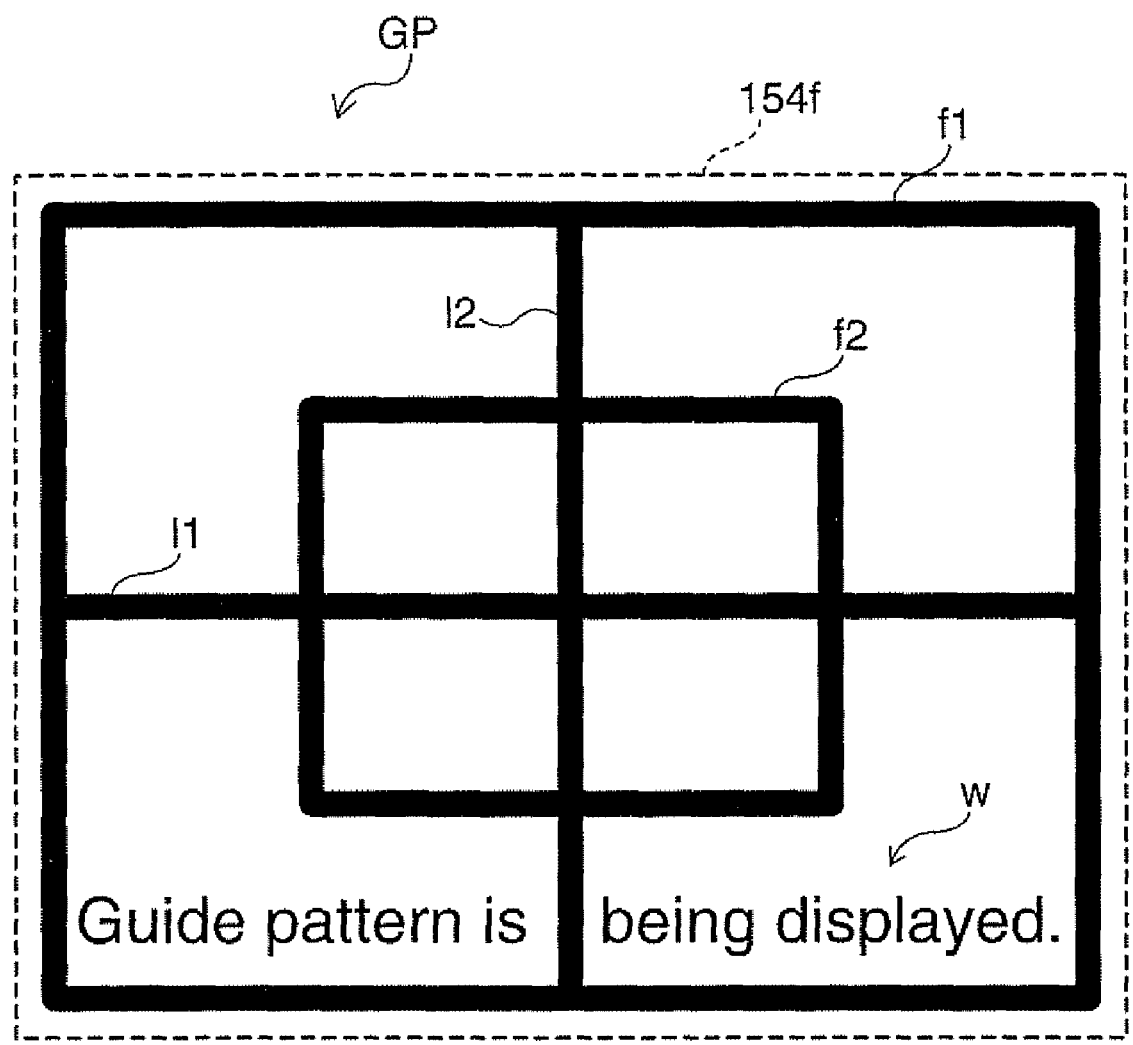
FIG. 6 is an illustration showing a guide pattern GP.

FIG. 6 is a block diagram schematically showing a configuration of a projector as the second embodiment of the invention. The projector 100A in this embodiment and the projector 100 of the first embodiment have same structure except only following points, that is, in this embodiment, a guide pattern data (stated later) is stored in the memory 130, and the control program executed on the CPU 160 is different from the first embodiment.
light modulator The CPU 160 in the projector 100A of this embodiment is, based on the angular velocity detected by the angular velocity sensor 190, not only causing an automatic keystone correction process to be started but also causing a keystone correction process in the keystone correction section 140 to be cancelled. Also, the CPU 160 causes the keystone correction section 140 to cancel the keystone correction process, and also to output guide pattern data GD stored in advance in the memory 130, in place of the uncorrected image data (not shown) stored in the memory 130. As a result, a guide pattern is displayed on the screen SC. The memory 130 in this embodiment includes area for storing the guide pattern data GD in addition to the areas for storing the original image data and the uncorrected image data. The keystone distortion correction section 140 accesses the address storing the guide pattern GD in the memory 130 to read out the guide pattern GD, and then the guide pattern GD read out from the memory 130 is supplied to the liquid crystal panel drive section 155.

Figure 5:
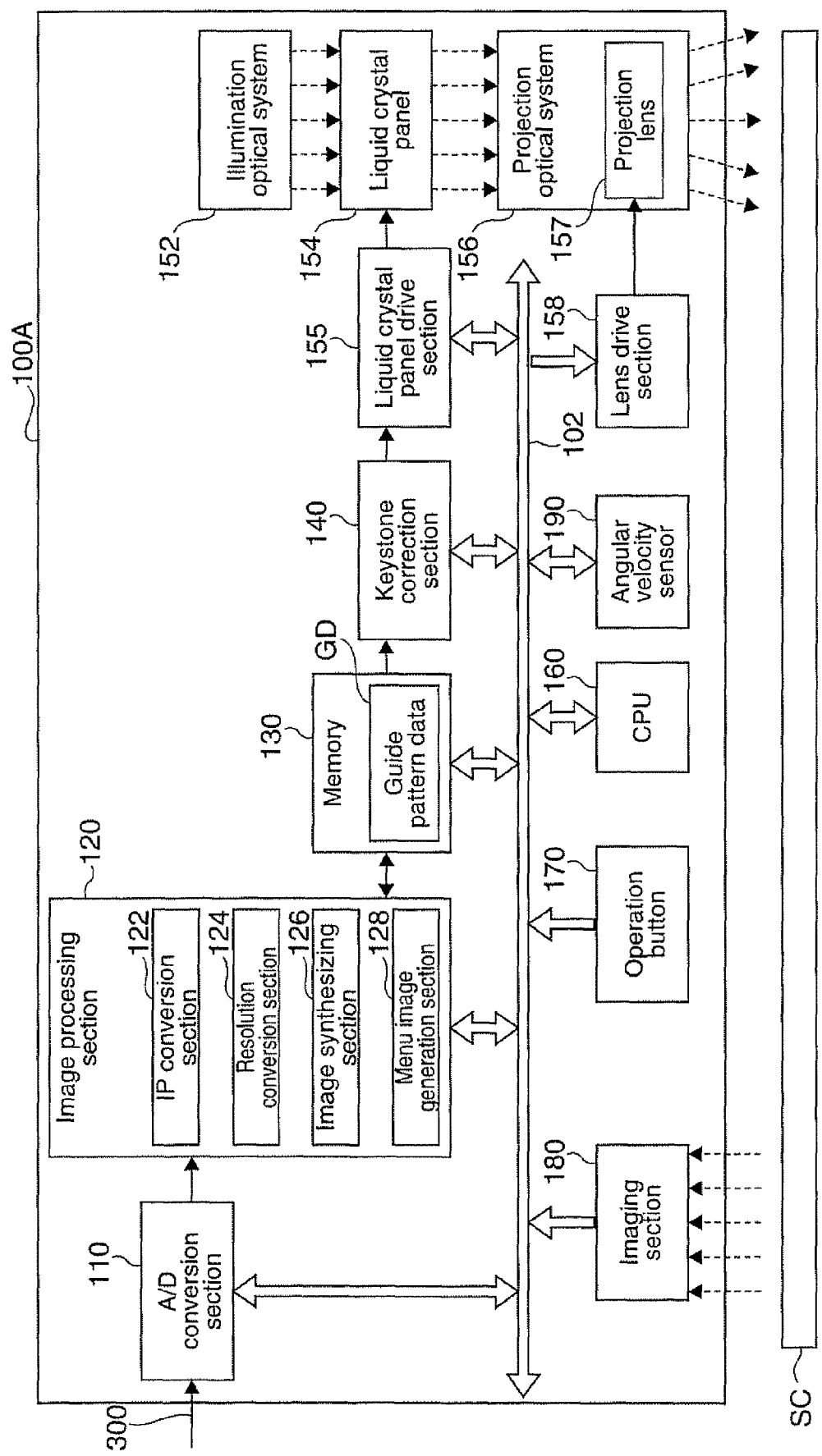
FIG. 5 is a block diagram schematically showing a configuration of a projector as one embodiment of the second embodiment.

FIG. 6 [EPU4] is an illustration showing a guide pattern GP represented by guide pattern data GD stored in advance in the memory 130. In FIG. 6, an outer frame 154f of the whole area of the liquid crystal panel 154 is illustrated by the broken line. As shown in FIG. 5, the guide pattern GP includes a first frame line f1, a second frame line f2, a horizontal bisector 11, a vertical bisector 12, and characters w saying "guide pattern is being displayed".

As shown in the illustration, the first frame line f1 coincides with the outer frame 154f of the whole area of the liquid crystal panel 154. In FIG. 6, in order to clearly show the guide pattern GP, the outer frame 154f of the whole area of the liquid crystal panel 154 and the outer frame of the guide pattern are displayed slightly misaligned. The horizontal bisector is a straight line which horizontally divides a rectangular area, formed by the first frame line f1, into two equal parts. The vertical bisector 12 is a straight line which vertically divides the rectangular area, formed by the first frame line f1, into two equal parts. That is, the intersection of the horizontal bisector 11 and vertical sector 12 represents the center of the whole area of the liquid crystal panel 154. The second frame line f2 is a frame line to which the first frame line f1 is reduced around its central point (that is, the intersection of the horizontal bisector 11 and vertical bisector 12) in such a way that the area formed by the second frame line f2 is 25% of the area formed by the first frame line f1. As the guide pattern GP, it not being limited to that of this embodiment, it is sufficient to represent at least the center of the whole area of the liquid crystal panel 154.

B-2. Operation of Projector

Figure 7:
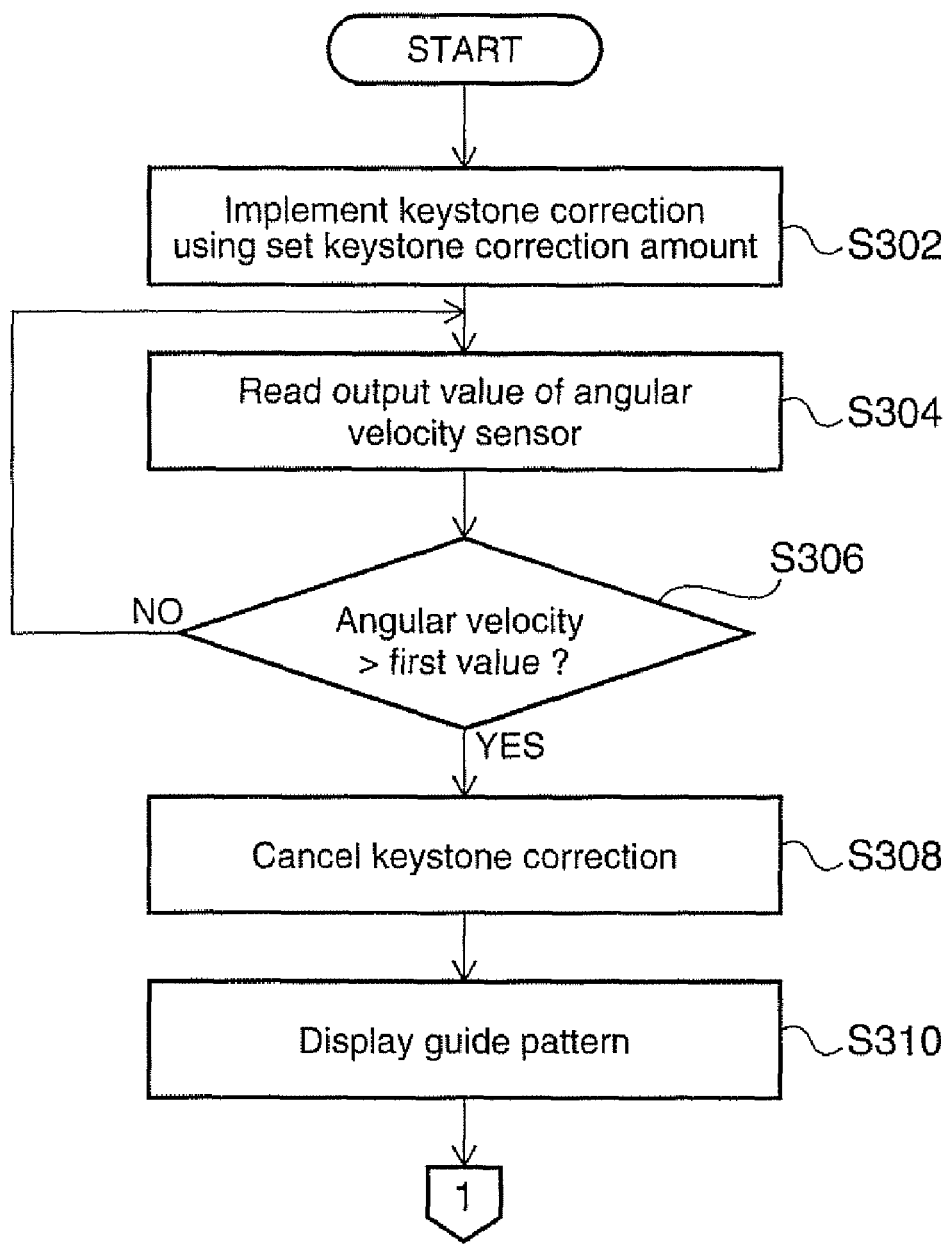
FIG. 7 is a flowchart showing a flow of a keystone correction cancellation process and keystone correction starting process in the projector 100.
Figure 8:
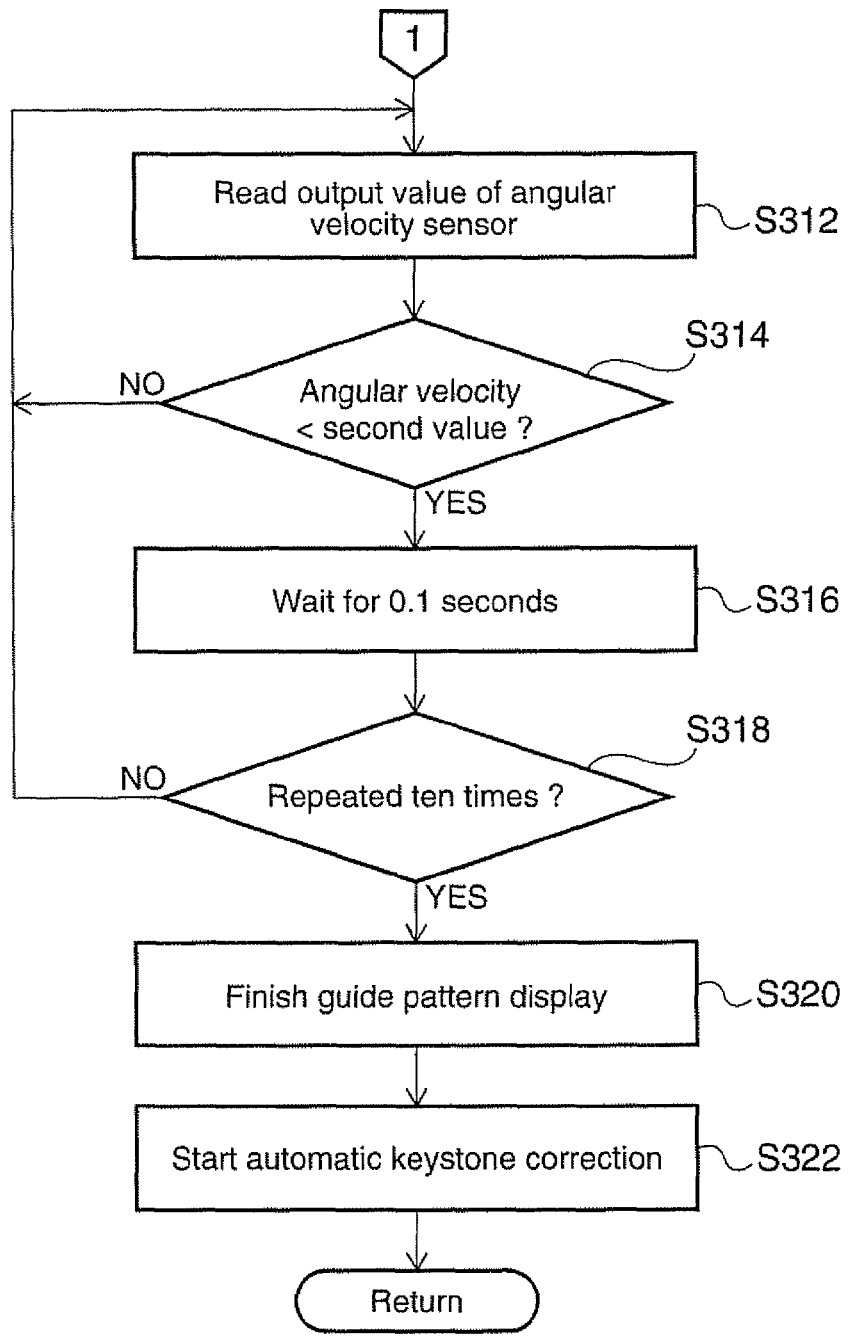
FIG. 8 is a flowchart showing a flow of the keystone correction cancellation process and keystone correction starting process in the projector 100.

FIGS. 7 and 8 are flowcharts showing flows of a keystone correction cancellation process and automatic keystone correction starting process in the projector 100A of this embodiment. On the projector 100A being powered on, the keystone correction section 140 subjects the uncorrected image data, written into the memory 130, to a keystone correction process by a keystone correction amount set in advance (step S302). The keystone correction amount at the previous operating time is set in the internal memory (not shown) of the keystone correction section 140. The previous operating time keystone correction amount is a value calculated in the keystone correction section 140 in accordance with a tilt of the projector 100A with respect to the screen SC at the previous projector operating time. The method of calculating the keystone correction amount is same as described in the first embodiment.

On the projector 100A being powered on, the CPU 160 reads a detection value of the angular velocity sensor 190 (step S304). The CPU 160 determines whether or not a detected angular velocity is greater than a first value (step S306) and, if the angular velocity is smaller than the first value (No in step S306), returns to step S304. The first value is set in advance. In step S306, the CPU 160, based on the angular velocity detected by the angular velocity sensor 190, determines that a movement of the projector 100A has been started. That is, the fact that the angular velocity is greater than the first value means that a movement of the projector 100A has been started.

If the angular velocity detected by the angular velocity sensor 190 is greater than the first value (Yes in step S306), the CPU 160 causes the keystone correction process in the keystone correction section 140 to be cancelled (step S308). Specifically, the CPU 160 rewrites the keystone correction amount stored in the internal memory (not shown) of the keystone correction section 140 to initial value (0, 0). The keystone correction amount is defined by the heretofore described pitch angle and yaw angle. As a method of canceling the keystone correction process, it is also acceptable to adopt a method of switching in such a way that the image data representing an image are output directly to the liquid crystal panel drive section 155, rather than through the keystone correction section 140.

Subsequently, the CPU 160 controls the keystone correction section 140 so as to retrieve the guide pattern data GD from the memory 130, and output the guide pattern data GD to the liquid crystal panel drive section 155. As a result, the guide pattern GP (FIG. 6) is displayed on the screen SC (step S310).

Then, the CPU 160 reads the detection value of the angular velocity sensor 190 again (step S312), and determines whether or not the angular velocity detected by the angular velocity sensor 190 is smaller than the second value (step S314). Herein, the second value, which is smaller than the first value, is set in advance. If the angular velocity is greater than the second value (No in step S314), the CPU 160 returns to step S312. Therefore, The guide pattern GP is still displayed on the screen SC.

If the angular velocity is smaller than the second value (Yes in step S314), the CPU 160 waits 0.1 seconds (step S310), and determines whether or not it has repeated the process of step S312 to step S316 ten times (step S318). If it has not repeated the process ten times (No in step S318), the CPU 160 returns to step S312. That is, the CPU 160 repeatedly carries out the process of step S312 to step S316 until it repeats the process of step S312 to step S316 ten times. In this embodiment, the fact that the CPU 160 has repeated the process of step S312 to step S316 ten times means that a predetermined time (for example, one second) has elapsed in a condition in which the angular velocity maintains a value lower than the second value.

In steps S312 to S316, the CPU 160 determines whether or not the movement of the projector 100A has stopped. The fact that the angular velocity is greater than the second value in step S314 means that the projector 100A is still being moved (moving). In the event that the angular velocity has been smaller than the second value ten times in a row in step S314, it means that the movement of the projector 100A has stopped.

The CPU 160, on determining that it has repeated the process of steps S312 to S316 ten times (Yes in step S312), by controlling the keystone correction section 140, causes the display of the guide pattern GP to be finished (step S320), and the automatic keystone correction process to be started (step S322), and returns to step S304. The step S332 in this embodiment executes the steps S122 to S130 of the first embodiment (FIG. 4).

In this embodiment, the keystone correction amount calculated in the step S322 is recorded in the internal memory (not shown) of the keystone correction section 140. Consequently, a keystone correction is performed in the keystone correction section 140, based on the keystone correction amount recorded in the internal memory of the keystone correction section 140, until a start of a movement of the projector 100A are detected again. On a movement of the projector 100A being detected again (Yes in step S306), the keystone correction amount recorded in the internal memory of the keystone correction section 140 is cancelled (that is, the keystone correction amount is set to the initial value (0, 0)) (step S308). On a stop of the movement of the projector 100A being detected (steps S312 to S318), a recalculated keystone correction amount is recorded in the internal memory of the keystone correction section 140 (step S322).

B-3. Advantage of Embodiment

A description provide the advantages of this embodiment over the projector 100p of the comparison example.

Figure 11A:
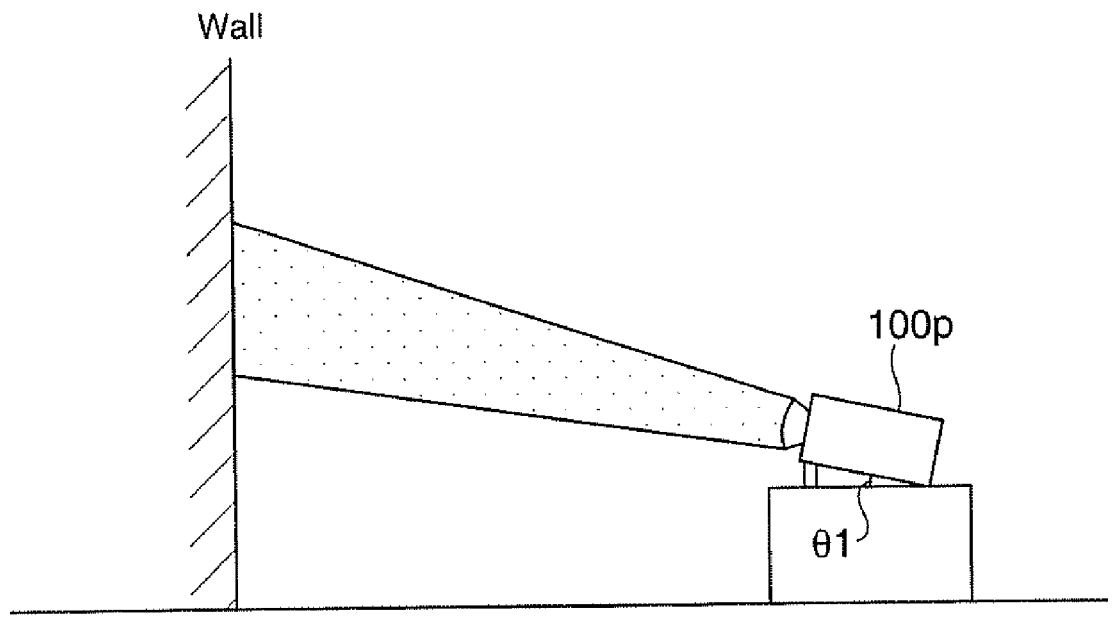
FIGS. 11A and 11B are illustrations showing how the user moves the projector and changes a position in which an image is displayed.
Figure 11B:
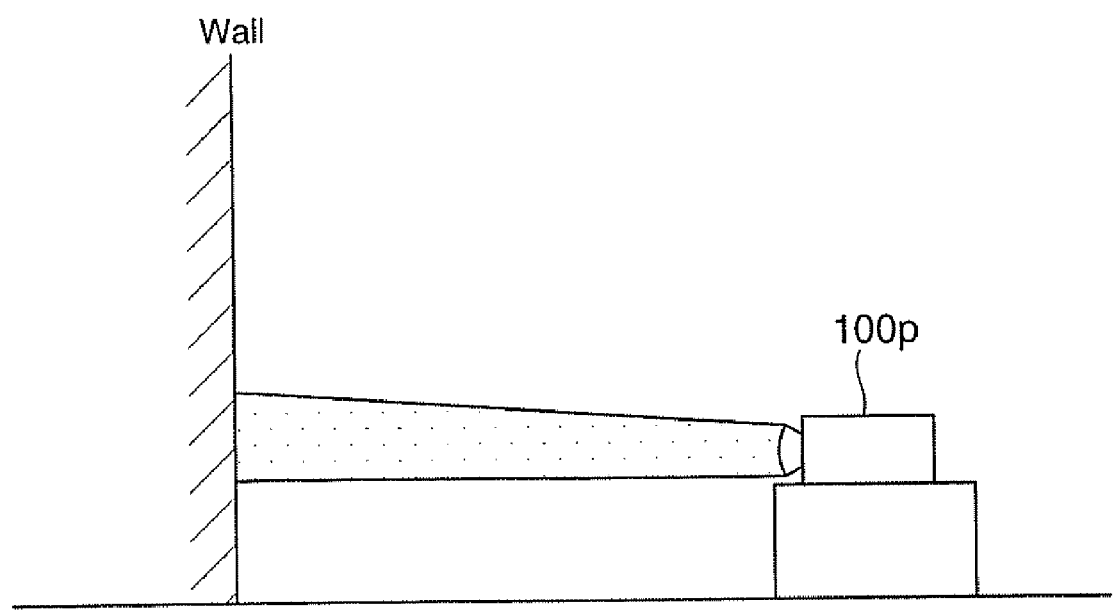

FIGS. 11A and 11B are illustrations showing how the user moves the projector and changes the position in which the image is displayed. FIG. 11A shows a condition in which a heretofore known projector 100p of the comparison example is installed tilted an angle θ1 upward from the horizontal. FIG. 11B shows a condition in which the projector 100p is horizontally installed. As shown in FIGS. 11A and 11B, the image is projected onto a wall surface in the comparison example. The user firstly causes the image to be displayed in the position of the wall surface shown in FIG. 11A and subsequently, by changing a tilt of the projector 100p, causes the image to be displayed below the position in FIG. 11A. It is taken that the position of the image displayed on the wall surface has not moved sideways.

FIG. 12 is an illustration conceptually showing a display image when the position of the projector has been moved, as shown in FIGS. 11A and 11B. A1 to A4 of FIG. 12 show a liquid crystal panel 154 included in the projector 100p. An image light generation area IG, out of the whole area of the liquid crystal panel, which modulates light from the light source into an image light representing the image, is shown diagonally hatched. An image light generation area before the keystone correction process is taken to be IG0, an image light generation area after a keystone correction process in the projector position in FIG. 11A (referred to also as a keystone correction 1) to be IG1, and an image light generation area after a keystone correction process in the projector position in FIG. 11B (referred to also as a keystone correction 2) to be IG2.

B1 to B4 of FIG. 12 show an image display area PIG which is an area on the wall surface in which the image is displayed. B1 to B4 of FIG. 12 illustrate a display image seen from the user facing the wall (FIGS. 11A and 11B). A panel display area PA which is the whole area of the liquid crystal panel 154 is shown by the broken line. The image display area PIG in which is displayed an image represented by an image light modulated by the liquid crystal panel 154 is shown diagonally hatched. An image generation area before the keystone correction 1 is taken to be PIG0, an image generation area after the keystone correction 1 in the projector position in FIG. 11A to be PIG1, an image generation area before the keystone correction 2 in the projector position in FIG. 11B to be PIG2, and an image generation area after the keystone correction 2 to be PIG3.

When the projector 100p is installed tilted the angle θ1 upward from the horizontal, as shown in FIG. 11A, the image light generation area IG0 coincides with the whole area of the liquid crystal panel 154 in a condition in which it has not been subjected to the keystone correction process (A1 of FIG. 12). At this time, the image display area PIG0 is distorted into a trapezoidal shape (B1 of FIG. 12).

In FIG. 12, a center PC of the liquid crystal panel 154 and panel display area PA is expressed by a symbol of a diamond shape, and a center IC of the image light generation area IG and image display area PIG by a symbol of a black circle. In this embodiment, an intersection of a line bisecting the height, and a line bisecting the width, of the image light generation area IG is taken to be the center IC of the image light generation area IG. The same applies to the center IC of the image display area PIG. This is because the user, when looking at the projection image, often recognizes that the vicinity of an intersection of a line bisecting the height, and a line bisecting the width, of the projection image is the center of the projection image. On the other hand, the center PC of the panel display area PA is taken to be the center of the shape of the panel display area PA. For example, in the event that the panel display area PA forms a trapezoidal shape, the intersection of the diagonal lines is the center PC of the panel display area PA.

As shown in A2 of FIG. 12, when carrying out the keystone correction process, the image light generation area IG0 (A1 of FIG. 12) is distorted in a direction the reverse of the image displayed on the projection surface, generating the image light generation area IG1 (A2 of FIG. 12). When the keystone correction 1 is performed in this way, the center PC (diamond shape) of the liquid crystal panel 154 and the center IC (black circle) of the image light generation area IG1 are misaligned in most cases (A2 of FIG. 12).

Subsequently, in order to cause an image to be displayed below the image display position shown in FIG. 11A (FIG. 11B), the user moves the projector 100p, and horizontally installs the projector 100p. At this time, as a keystone correction amount (parameter) in the keystone correction process is not changed, the shape of the image light generation area IG1 maintains the shape shown in A2 of FIG. 12, as shown in A3 of FIG. 12. In the position in FIG. 11B, the projector 100p is horizontally installed, and the projector 100p faces the wall surface.

For this reason, the panel display area PA2 forms a rectangle which is the same as the shape of the liquid crystal panel 154 (B3 of FIG. 12). On the keystone correction process (which is displayed as the keystone correction 2 in FIG. 12) being implemented again in the condition in which the projector 100p is horizontally installed (FIG. 11B), the image display area PIG2 coincides with the whole area of the liquid crystal panel 154 (A4 of FIG. 12). Consequently, an image in which the image display area PIG2 forms a rectangle is displayed on the wall surface (B4 of FIG. 12).

The user assumes that, in the event that the keystone correction 2 is performed after the projector 100p has been horizontally installed, an image display area EIG is displayed which has been corrected into a rectangle centering around the center IC of the image display area PIG1 shown in B3 of FIG. 12. The image display area EIG assumed by the user is shown by the chain line in B4 of FIG. 12. A center EIC of the image display area EIG is shown by a symbol of a black square. The position of the center EIC (B4 of FIG. 12) of the image display area EIG coincides with the center IC (B3 of FIG. 12) of the image display area PIG1.

However, the center IC of an image display area PIG after the keystone correction 2 has been performed coincides with the center PC of the panel display area PA2, and does not coincide with the center EIC of the image display area EIG (FIG. 12B4). That is, the image display area PIG2 is formed in the position different from the position assumed by the user (B4 of FIG. 12).

Figure 9A:
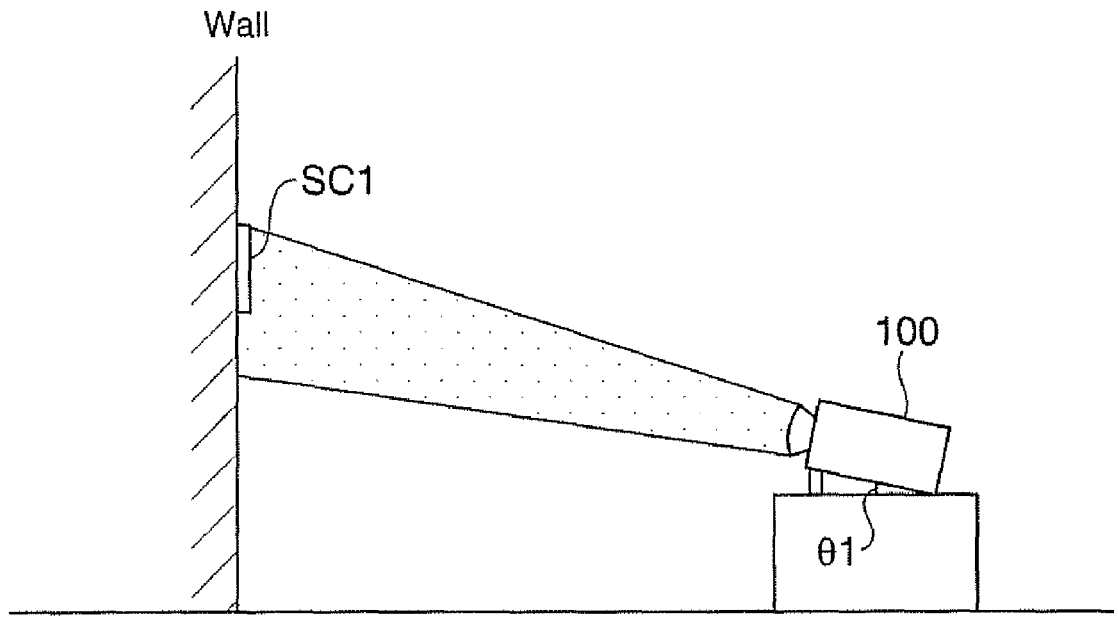
FIGS. 9A and 9B are illustrations showing how a user moves the projector and changes a position in which an image is displayed.
Figure 9B:
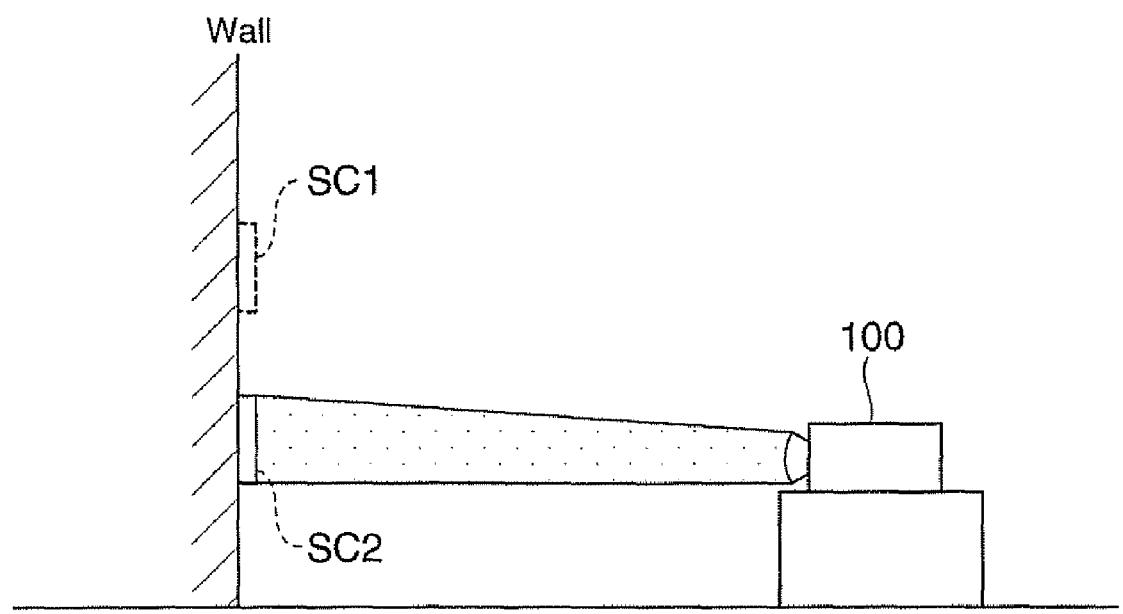

FIGS. 9R and 9B are, in this embodiment, illustrations showing how the user moves the projector, and changes a position in which an image is displayed. FIG. 9A shows a condition in which the projector 100A is installed tilted an angle θ1 upward from the horizontal, and FIG. 9B shows a condition in which the projector 100A is horizontally installed. In this embodiment, in order to clearly show a position in which the user wants to display an image, it is taken that a screen onto which to project the image is installed on a wall (FIGS. 9A and 98). In FIG. 9B, the position of a screen SC2 is moved below the position of a screen SC1 in FIG. 9A. In FIG. 9B, the position of the screen SC1 is shown by the broken line. It is taken that the positions of the screen SC1 and screen SC2 have not moved sideways. FIGS. 9A and 9B illustrate a case in which the user, in order to change an image projection position from the screen SC1 to the screen SC2, moves the projector 100A from the position shown in FIG. 9A to position shown in FIG. 9B.

FIG. 10 is an illustration conceptually showing a display image when the position of the projector in this embodiment is moved, as shown in FIGS. 9A and 9B. FIG. 10, in the same way as in FIG. 12 previously described, shows the liquid crystal panel 154 (A1 to A4) and an image display area (B1 to B4). In A1 to A4 of FIG. 10, in the same way as in FIG. 12, an image light generation area IG, out of the whole area of the liquid crystal panel, which modulates light from the light source into an image light representing an image, is shown diagonally hatched. An image light generation area after the keystone correction process in the projection position shown in FIG. 9A is taken to be IG1, an image light generation area after the keystone correction cancellation to be IG2, and an image light generation area after the keystone correction process in the projector position shown in FIG. 9B to be IG3. A2 and A3 of FIG. 10 represent a condition in which an image light representing the guide pattern GP is being generated in the liquid crystal panel 154.

In B1 to B4 of FIG. 10, in the same way as in FIG. 12, a panel display area PA which is the whole area of the liquid crystal panel 154 is shown by the broken line. Also, an image display area PIG in which is displayed an image representing an image light modulated by the liquid crystal panel 154 is shown diagonally hatched. The outer frame of the screen SC is shown by the heavy line. An image generation area after the keystone correction process in the projector position shown in FIG. 9A is taken to be PIG1, and an image generation area after the keystone correction process in the projector position shown in FIG. 9B to be PIG4.

A1 and B1 of FIG. 10 represent a case in which a keystone correction has been made in the projector position shown in FIG. 9A. As shown in FIG. 9A, as the projector 100A is tilted the angle θ1 upward from the horizontal, a panel display area PA1 is distorted into a trapezoid. As the image light generation area IG1 of the liquid crystal panel 154 is distorted into a trapezoidal shape in a direction the reverse of the panel display area PA1 (A1 of FIG. 12), the image display area PIG1 is corrected into a rectangle, and fits into the frame of the screen SC1 (B1 of FIG. 12). At this time, a center SCC (the white circle) of the screen SC1 and a center IC (the black circle) of an image display area PIG1 coincide.

On the user starting a movement of the projector 100A, the keystone correction is cancelled in the projector 100A, and an image light representing the guide pattern GP is generated in the liquid crystal panel 154 (A2 of FIG. 10). At this time, supposing that the projector 100 is still in the vicinity of the position shown in FIG. 9A, the guide pattern is displayed on a wall surface in a condition in which it is distorted into a trapezoid (B2 of FIG. 10). At this time, the center SCC (white circle) of the screen SC1, the center IC (black circle) of the image display area PIG2, and a center PC (the diamond shape) of the panel display area PA1 do not coincide. The center of the panel display area PA1 coincides with the center of the guide pattern GP (that is, the intersection of 11 and 12).

The user moves the projector 100A in a condition in which the guide pattern GP is displayed on the wall surface in this way. On the user moving the projector 100A in such a way as to cause the center of the guide pattern GP (that is, the intersection of 11 and 12) to coincide with the center SCC (white circle) of the screen SC2, the projector 100 is horizontally installed, as shown in FIG. 9B. The user installs the projector 100A in the position of FIG. 9B and, in the event that he or she does not move it after that, the projector 100A starts an automatic keystone correction (referred to also as a keystone correction 2). As the projector 100A is horizontally installed, the keystone correction amount becomes (0, 0) and, in the liquid crystal panel 154, a rectangular image light generation area IG is generated so as to fill the whole area of the liquid crystal panel 154 (A4 of FIG. 10). Consequently, the image display area PIG4 forms a rectangle, and fits into the frame of the screen SC2.

As heretofore described, according to the projector 100A of this embodiment, on a start of a movement of the projector 100A being detected, the keystone correction process is cancelled, and the guide pattern is displayed. For this reason, on the user moving the projector 100A in such a way that the center of the guide pattern coincides with the center of the screen SC2, an image is displayed in the middle of the screen SC2. That is, it is possible to display an image in a position which the user intends. Depending on the relative positions of the screen and projector 100A after the movement of the projector 100A, it may happen that the center of the image display area and the center of the screen do not coincide. However, in that case too, it is possible to reduce a misalignment between the center of an image display area PIG when a keystone correction has been performed after a movement of the projector and the center of the screen, in comparison with a case of moving the position of the projector without canceling the keystone correction process as the projector 100p of the comparison example. That is, in a case of performing a keystone correction by changing the display position of an image displayed by the projector 100A, it is possible to reduce a misalignment between an image display position which the user assumes and an actual image display position.

Also, on the movement of the projector 100A being stopped, the automatic keystone correction process is started. For this reason, even though the user does not carry out any operation, a distortion of an image projected onto the screen SC is corrected, and the focus is adjusted, so the user-friendliness is improved.

C. Modification Examples

The invention, not being limited to the heretofore described embodiments, can be implemented in various forms without departing from the scope thereof.

1. In the heretofore described embodiments, the angular velocity sensor 190 is used to detect a movement and stop of the projector 100 but, not being limited to the angular velocity sensor 190, it is sufficient to use one which can detect a movement and stop of the projector 100. It is possible to use, for example, a G sensor, an acceleration sensor, or an optical sensor, in place of the angular velocity sensor 190. Also, it is also possible to detect a movement and stop of the projector 100 based on an image imaged by the imaging section 180.

2. In the heretofore described embodiments, the distance detection pattern is projected onto the screen SC, and a keystone correction amount and a position of the focus lens are calculated based on the image imaged by the imaging section 180, but a method of calculating a keystone correction amount and a position of the focus lens is not limited to the heretofore described embodiments. It is also acceptable to configure in such a way as to calculate a position of the focus lens by a method of, for example, irradiating the screen SC with an infrared ray, an ultrasonic wave, or the like, and detecting a distance based on time taken until a reflected wave returns, and on an irradiation angle.

3. In the heretofore described embodiments, the keystone correction section 140 sets the keystone correction amount to (0, 0) before the distance detection pattern is projected, but it is also acceptable that the keystone correction amount is not set to (0, 0). It is also acceptable to adopt a configuration such that, for example, in the event that the previous operating time keystone correction amount is recorded in the internal memory of the keystone correction section 140, and a keystone correction based on the value thereof is being performed, a tilt of the screen SC and a distance to the center of the screen are calculated considering the keystone correction amount recorded in the internal memory of the keystone correction section 140.

4. In the heretofore described embodiments, after the keystone correction amount and focus position calculation has been finished, a keystone correction based on the calculated keystone correction amount and a movement of the focus lens are implemented, but it is acceptable that both processes are carried out either sequentially or at the same time. In the event that they are carried out sequentially, it is also acceptable to carry out either process first.

5. In the heretofore described embodiments, with the projector 100, light from the illumination optical system 152 is modulated using the transmissive liquid crystal panel 154 but, not being limited to the transmissive liquid crystal panel 154, it is also acceptable to adopt a configuration such that light from the illumination optical system 152 is modulated using, for example, a digital micro-mirror device or a reflective liquid crystal panel (liquid crystal on silicon: LCOS).

6. In the heretofore described embodiments, the distance detection pattern is projected onto the screen SC, and a keystone correction amount is calculated based on the image imaged by the imaging section 180, but a method of calculating a keystone correction amount is not limited to the heretofore described embodiments. For example, when only a vertical keystone correction is automatically performed, it is also acceptable to adopt a configuration such that a keystone correction amount is calculated by using the G sensor to obtain a tilt of the projector 100 with respect to the screen SC. Also, it is also acceptable to adopt a configuration such that a tilt of the projector 100 with respect to the screen SC is obtained using a line sensor (the optical sensor).

7. In the heretofore described embodiments, a configuration has been illustrated such that, in the event that a start of a movement of the projector 100 has been detected, as well as the keystone correction process being cancelled, the guide pattern GP is displayed in place of an image displayed at that time (an image represented by the uncorrected image data stored in the memory 130), but it is sufficient that at least the keystone correction process is cancelled. It is also acceptable to adopt, for example, a configuration such that, even after the keystone correction process has been cancelled, an image displayed at that time (an image represented by the uncorrected image data stored in the memory 130) continues to be displayed. It is also acceptable to adopt a configuration such that a comment to the effect that the keystone correction process has been cancelled (for example, "keystone correction process has been cancelled") is displayed at this time. By so doing, even in the event that the shape of the image bounds of the display image is changed, it is possible to reduce a possibility of the user worrying about a failure or the like and getting upset.

It is also acceptable to adopt a configuration such that synthesized guide pattern data in which are synthesized the image data supplied from the resolution conversion section 124 and the guide pattern data stored in the memory 130 are generated in the image synthesizing section 126. By so doing, an image with the guide pattern superimposed on an input image is displayed on the screen SC. By so doing too, it is possible to obtain the same advantages as those of the embodiments.

8. In the heretofore described embodiments, a configuration is illustrated such that the automatic keystone correction process is started in the event that a stop of the movement of the projector 100 has been detected, but a configuration does not have to be such that the automatic keystone correction process is automatically started. That is, it is also acceptable to adopt a configuration such that the automatic keystone correction process is simply cancelled by the fact that a start of a movement of the projector 100 has been detected. It is also acceptable that the user carries out an alignment of the projector in the condition in which the automatic keystone correction process is cancelled (a condition in which the projection image is distorted), and subsequently, by operating the operation button 170, implements the automatic keystone correction process. By so doing too, it is possible to reduce a misalignment between an image display position after the automatic keystone correction process and an image display position which the user assumes, improving the user-friendliness.

9. In the hereto fore described embodiments, for example, it is also acceptable to execute the automatic keystone distortion correction process, after the predetermined period elapsed from the time that is the angular velocity became less than the predetermined value, if the angular velocity detected on the angular velocity sensor 190 becomes less than the predetermined value.

10. In the hereto fore described embodiments, it is also acceptable to only start the autofocus process in the event that a stop of the movement of the projector 100 has been detected. It is also acceptable to start only the autofocus process in the event that a stop of the movement of the projector 100 has been detected. It is also acceptable to cancel the keystone correction process in the event that the start of the movement of the projector 100 has been detected, after that, the autofocus process can be started when the stop of the movement of the projector 100 is detected.

Although a description has heretofore been given of the various embodiments of the invention, the invention not being limited to these embodiments, it goes without saying that it is possible to adopt various configurations without departing from the scope thereof. It is also acceptable to take it that, for example, a function realized with hardware is realized with software by a CPU executing a predetermined program.

What is claimed is:

1. A projector which projects an image onto a projection surface, and displays it thereon, comprising:
a light source;
a light modulator which modulates light from the light source into an image light representing the image;
a projection optical system which projects the image light modulated by the light modulator on the projection surface;
a keystone distortion correction section which carries out a keystone distortion correction process for correcting a keystone distortion of the image projected onto the projection surface;
a detection section which detects a stop of a movement of the projector; and
a control section which, on the stop of the movement of the projector being detected in the detection section, causes the keystone distortion correction section to start the keystone distortion correction process in accordance with a relative positional relationship between the projector after being moved and the projection surface, wherein
the detection section includes an angular velocity sensor which detects an angular velocity of the projector and the detection section detects the stop of the movement of the projector in the event that a predetermined time has elapsed in a condition in which the angular velocity detected by the angular velocity sensor, after exceeding a first value set in advance, becomes lower than a second value which is lower than the first value, and maintains a value lower than the second value.

2. The projector according to claim 1, further comprising:
an autofocus section which automatically adjusts a focus in the projection optical system in such a way that an image is formed on the projection surface, wherein
the control section, on the stop of the movement of the projector being detected, causes the autofocus section to start the adjustment of the focus.

3. The projector according to claim 1, wherein
the detection section detects the start of the movement of the projector, and
the control section, when the start of the movement of the projector is detected in the detection section, cancels the keystone distortion correction process in the keystone distortion correction section.

4. The projector according to claim 3, further comprising:
a storage section in which guide pattern data are stored, the guide pattern data representing a guide pattern which shows the center of a maximum area of the light modulator in which the light from the light source can be modulated, wherein
the control section, as well as canceling the keystone distortion correction process in the keystone distortion correction section, causes the light modulator to generate an image light representing the guide pattern based on the guide pattern data stored in the storage section.

5. A projector which projects an image onto a projection surface, and displays it thereon, comprising:
a light source;
a light modulator which modulates light from the light source into an image light representing the image;
a projection optical system which includes an autofocus section for automatically adjusting a focus in such a way that the image light modulated by the light modulator is imaged on the projection surface;
a detection section which detects a stop of a movement of the projector; and
a control section which, on the stop of the movement of the projector being detected in the detection section, causes the autofocus section to start the adjustment of the focus, wherein
the detection section includes an angular velocity sensor which detects an angular velocity of the projector and the detection section detects the stop of the movement of the projector in the event that a predetermined time has elapsed in a condition in which the angular velocity detected by the angular velocity sensor, after exceeding a first value set in advance, becomes lower than a second value which is lower than the first value, and maintains a value lower than the second value.

6. The projector according to claim 5, further comprising:
a keystone distortion correction section which carries out a keystone distortion correction process for correcting a keystone distortion of the image projected onto the projection surface, wherein
the control section, on the stop of the movement of the projector being detected in the detection section, causes the keystone distortion correction section to start the keystone distortion correction process in accordance with a relative positional relationship between the projector after being moved and the projection surface.

7. The projector according to claim 6, wherein
the detection section detects the start of the movement of the projector, and
the control section, when the start of the movement of the projector is detected in the detection section, cancels the keystone distortion correction process in the keystone distortion correction section.

8. The projector according to claim 7, further comprising:
a storage section in which guide pattern data are stored, the guide pattern data representing a guide pattern which shows the center of a maximum area of the light modulator in which the light from the light source can be modulated, wherein
the control section, as well as canceling the keystone distortion correction process in the keystone distortion correction section, causes the light modulator to generate an image light representing the guide pattern based on the guide pattern data stored in the storage section.

9. A projector which projects an image onto a projection surface, and displays it thereon, comprising:
a light source;
a light modulator which modulates light from the light source into an image light representing the image;
a projection optical system which includes an autofocus section for automatically adjusting a focus in such a way that the image light modulated by the light modulator is imaged on the projection surface;
a keystone distortion correction section which carries out a keystone distortion correction process for correcting a keystone distortion of the image projected onto the projection surface;
a detection section which detects a stop of a movement of the projector; and
a control section which, on the stop of the movement of the projector being detected in the detection section, as well as causing the keystone distortion correction section to start the keystone distortion correction process in accordance with a relative positional relationship between the projector after being moved and the projection surface, causes the autofocus section to start the adjustment of the focus, wherein
the detection section includes an angular velocity sensor which detects an angular velocity of the projector and the detection section detects the stop of the movement of the projector in the event that a predetermined time has elapsed in a condition in which the angular velocity detected by the angular velocity sensor, after exceeding a first value set in advance, becomes lower than a second value which is lower than the first value, and maintains a value lower than the second value.

10. The projector according to claim 9, wherein
the detection section detects the start of the movement of the projector, and
the control section, when the start of the movement of the projector is detected in the detection section, cancels the keystone distortion correction process in the keystone distortion correction section.

11. The projector according to claim 10, further comprising:
a storage section in which guide pattern data are stored, the guide pattern data representing a guide pattern which shows the center of a maximum area of the light modulator in which the light from the light source can be modulated, wherein
the control section, as well as canceling the keystone distortion correction process in the keystone distortion correction section, causes the light modulator to generate an image light representing the guide pattern based on the guide pattern data stored in the storage section.

12. A method of controlling a projector which projects an image on a projection surface, and displays it thereon, comprising:
(a) detecting a stop of a movement of the projector by detecting the stop of the movement of the projector when a predetermined time has elapsed in a condition in which a detected angular velocity of the projector, after exceeding a first value set in advance, becomes lower than a second value which is lower than the first value, and maintains a value lower than the second value; and
(b) on the stop of the movement of the projector being detected, starting a keystone distortion correction process for correcting a keystone distortion of the image projected onto the projection surface in accordance with a relative positional relationship between the projector after being moved and the projection surface.

13. The method according to claim 12, wherein the step (b) further comprises:
(b1) initializing a keystone correction amount which is a parameter used for the keystone distortion correction process;
(b2) projecting a plurality of distance detection patterns which are used for detecting a distance from the projector to the projection surface;
(b3) measuring distances from the projector to a plurality of points on a screen by using the plurality of distance detection patterns;
(b4) calculating a tilt of the projector with respect to the projection surface in accordance with the measured distances; and
(b5) calculating the keystone correction amount in accordance with the tilt of the projector.

14. The method according to claim 13, the projector controlled by the method including a focus lens for adjusting a focus in such a way that the image is focused on the projection surface, the method further comprising:
(c) measuring a distance from the projector to the center of the screen;
(d) calculating a position of the focus lens in accordance with the distance from the projector to the center of the screen; and
(e) moving the focus lens to the calculated position of the focus lens.

* * * * *